US012429788B2

(12) United States Patent
Uratani et al.

(10) Patent No.: US 12,429,788 B2
(45) Date of Patent: Sep. 30, 2025

(54) PROCESS CARTRIDGE

(71) Applicant: CANON KABUSHIKI KAISHA, Tokyo (JP)

(72) Inventors: Kozue Uratani, Shizuoka (JP); Takashi Kenmoku, Shizuoka (JP); Koki Inoue, Shizuoka (JP); Tatsuya Saeki, Shizuoka (JP); Kunihiko Sekido, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 544 days.

(21) Appl. No.: 17/936,943

(22) Filed: Sep. 30, 2022

(65) Prior Publication Data

US 2023/0116451 A1 Apr. 13, 2023

(30) Foreign Application Priority Data

Oct. 8, 2021 (JP) ................................ 2021-166513
Aug. 15, 2022 (JP) ................................ 2022-129340
Sep. 15, 2022 (JP) ................................ 2022-146705

(51) Int. Cl.
*G03G 5/147* (2006.01)
*G03G 9/087* (2006.01)
*G03G 21/18* (2006.01)

(52) U.S. Cl.
CPC ..... *G03G 5/14704* (2013.01); *G03G 9/08782* (2013.01); *G03G 21/1814* (2013.01)

(58) Field of Classification Search
CPC ........... G03G 5/14704; G03G 21/1814; G03G 9/08782
See application file for complete search history.

(56) References Cited

U.S. PATENT DOCUMENTS 5,701,571 A * 12/1997 Amamiya .......... G03G 21/0047 399/351
6,777,153 B2 8/2004 Yano
(Continued)

FOREIGN PATENT DOCUMENTS

JP 2009229495 A * 10/2009

OTHER PUBLICATIONS

English machine translation of the description of JP-2009229495-A (Year: 2009).*
(Continued)

*Primary Examiner* — Mark F. Huff
*Assistant Examiner* — Boone Alexander Evans
(74) *Attorney, Agent, or Firm* — VENABLE LLP

(57) ABSTRACT

A process cartridge that is detachable from a main body of an electrophotographic apparatus, in which a surface protective layer of an electrophotographic photosensitive member contains an electroconductive particle; the content of the electroconductive particle is 20.0 to 70.0% by volume of the surface protective layer; the surface protective layer has a volume resistivity of $1.0\times10^{9}$ to $1.0\times10^{14}$ Ω·cm; a toner particle has at least one multivalent metal element selected from the group consisting of aluminum, magnesium, calcium, and iron; and a total content of the multivalent metal elements in the toner particle, as measured by coupled induction plasma atomic emission spectrometry (ICP-AES), is 0.10 to 1.25 μmol/g.

7 Claims, 3 Drawing Sheets

(56) References Cited

U.S. PATENT DOCUMENTS

| | | | |
|---|---|---|---|
| 6,808,907 | B2 | 10/2004 | Honma |
| 6,908,721 | B2 | 6/2005 | Kenmoku |
| 6,911,520 | B2 | 6/2005 | Fukui |
| 7,045,321 | B2 | 5/2006 | Imamura |
| 7,393,912 | B2 | 7/2008 | Mihara |
| 7,399,568 | B2 | 7/2008 | Fukui |
| 7,408,017 | B2 | 8/2008 | Imamura |
| 7,452,960 | B2 | 11/2008 | Yano |
| 7,510,813 | B2 | 3/2009 | Yano |
| 7,638,194 | B2 | 12/2009 | Fukui |
| 7,638,590 | B2 | 12/2009 | Fukui |
| 7,682,765 | B2 | 3/2010 | Sugawa |
| 7,795,363 | B2 | 9/2010 | Fukui |
| 7,935,771 | B2 | 5/2011 | Fukui |
| 8,067,136 | B2 | 11/2011 | Yano |
| 8,093,342 | B2 | 1/2012 | Minami |
| 8,110,329 | B2 | 2/2012 | Tominaga |
| 8,178,271 | B2 | 5/2012 | Fukui |
| 8,383,312 | B2 | 2/2013 | Fujimoto |
| 8,574,801 | B2 | 11/2013 | Itabashi |
| 8,609,312 | B2 | 12/2013 | Itabashi |
| 8,828,633 | B2 | 9/2014 | Itabashi |
| 8,918,035 | B2 | 12/2014 | Hasegawa |
| 9,029,056 | B2 | 5/2015 | Kenmoku |
| 9,098,002 | B2 | 8/2015 | Kenmoku |
| 9,098,003 | B2 | 8/2015 | Masumoto |
| 9,244,371 | B2 | 1/2016 | Suzumura |
| 9,304,422 | B2 | 4/2016 | Matsui |
| 9,348,246 | B2 | 5/2016 | Magome |
| 9,354,545 | B2 | 5/2016 | Matsui |
| 9,377,708 | B2 | 6/2016 | Magome |
| 9,423,711 | B2 | 8/2016 | Uratani |
| 9,423,714 | B2 | 8/2016 | Kenmoku |
| 9,442,416 | B2 | 9/2016 | Magome |
| 9,625,842 | B2 | 4/2017 | Uratani |
| 9,658,546 | B2 | 5/2017 | Tanaka |
| 9,804,514 | B2 | 10/2017 | Suzumura |
| 9,841,692 | B2 | 12/2017 | Hasegawa |
| 9,857,707 | B2 | 1/2018 | Tsuda |
| 9,964,874 | B2 | 5/2018 | Suzumura |
| 10,114,303 | B2 | 10/2018 | Katsura |
| 10,228,627 | B2 | 3/2019 | Nagashima |
| 10,310,397 | B2 | 6/2019 | Sano |
| 10,578,990 | B2 | 3/2020 | Tsuda |
| 10,698,327 | B2 | 6/2020 | Nagashima |
| 10,747,136 | B2 | 8/2020 | Kenmoku |
| 10,782,623 | B2 | 9/2020 | Yoshiba |
| 10,852,650 | B2 | 12/2020 | Inoue |
| 11,112,708 | B2 | 9/2021 | Uratani |
| 11,169,458 | B2 | 11/2021 | Toyoizumi |
| 11,175,600 | B2 | 11/2021 | Uchiyama |
| 11,256,187 | B2 | 2/2022 | Ogaki |
| 11,314,178 | B2 | 4/2022 | Kenmoku |
| 11,347,157 | B2 | 5/2022 | Kamikura |
| 11,467,510 | B2 | 10/2022 | Terui |
| 11,531,282 | B2 | 12/2022 | Kamikura |
| 2005/0260514 | A1 | 11/2005 | Mihara |
| 2006/0194071 | A1 | 8/2006 | Yano |
| 2012/0172562 | A1 | 7/2012 | Kenmoku |
| 2013/0065174 | A1 | 3/2013 | Itabashi |
| 2015/0185648 | A1 | 7/2015 | Uratani |
| 2016/0378003 | A1 | 12/2016 | Arimura |
| 2020/0209773 | A1* | 7/2020 | Tominaga .......... G03G 9/09708 |
| 2021/0063902 | A1 | 3/2021 | Inoue |
| 2021/0318630 | A1 | 10/2021 | Terui |
| 2021/0382406 | A1 | 12/2021 | Yamashita |
| 2021/0405549 | A1 | 12/2021 | Ookubo |
| 2022/0026821 | A1 | 1/2022 | Amano |
| 2022/0128916 | A1 | 4/2022 | Yoshida |
| 2022/0128918 | A1 | 4/2022 | Kototani |
| 2022/0146952 | A1 | 5/2022 | Komiya |
| 2022/0146955 | A1 | 5/2022 | Nozaki |
| 2022/0206402 | A1 | 6/2022 | Uratani |
| 2022/0214629 | A1 | 7/2022 | Kenmoku |
| 2022/0214630 | A1 | 7/2022 | Kamikura |
| 2022/0413407 | A1 | 12/2022 | Inoue |
| 2023/0004099 | A1 | 1/2023 | Seino |

OTHER PUBLICATIONS

U.S. Appl. No. 17/814,143, Tatsuya Saeki, filed Jul. 21, 2022.
U.S. Appl. No. 17/935,721, Takashi Kenmoku, filed Sep. 27, 2022.
U.S. Appl. No. 17/936,104, Tatsuya Saeki, filed Sep. 28, 2022.
U.S. Appl. No. 18/046,585, Yuta Komiya, filed Oct. 14, 2022.
U.S. Appl. No. 18/046,590, Kosuke Fukudome, filed Oct. 14, 2022.
U.S. Appl. No. 18/053,846, Kenta Kamikura, filed Nov. 9, 2022.
Chemistry Handbook, Fundamentals-II, Revised 4th edition, Chem. Soc. Jap., (1993) 489-93.

* cited by examiner

PROCESS CARTRIDGE

BACKGROUND OF THE INVENTION

Field of the Invention

The present disclosure relates to a process cartridge used in copying machines and printers that use an electrophotographic method and an electrostatic recording method.

Description of the Related Art

In recent years, higher image qualities have been required for printers and copying machines. Furthermore, since usage environment of users covers a broad range of environments, stable image quality has been required regardless of the usage environment.

In response to this demand, toners manufactured by an emulsion aggregation method has been frequently proposed in terms of a wide range of material selectivity and facilitation of control of toner particle shape. In the emulsion aggregation method, a resin particle dispersion by emulsion polymerization, forced emulsification, phase inversion emulsification or the like, and a coloring agent dispersion in which the coloring agent is dispersed in a solvent, are prepared. They are then mixed to form an aggregate having an equivalent size of a toner particle by using an aggregation agent, and the aggregate is heated for fusion and unification to produce toner.

Multivalent metal ions are generally used as the aggregation agents, and the presence of metal ions derived from the aggregation agent in a toner particle can leak charge accumulated on the surface of the toner particle. This inhibits toner charge-up phenomenon, especially in low temperature and low humidity environments where charge facilitates accumulation, and minimizes harmful effects of toner being developed on an unprinted portion of an image due to toner charge deficiency (hereinafter referred to as "fogging"). In contrast, in high temperature and high humidity environments where there is a lot of moisture in the air, charge on a toner surface leaks and an electric charge amount reduces, resulting in generation of fogging and a problem of being unable to obtain an image with excellent gradation. Excellent gradation refers to clearly enabling to see the difference in gradation of color in an image. The gradation of color is expressed by increasing or decreasing the amount of toner per unit area on an image, and in a case in which an electric charge amount of toner is low, the amount of toner developed on an electrophotographic photosensitive member (hereinafter also referred to as "photosensitive member") may be high or extremely low, which makes it difficult to see the subtle difference in gradation of color on an image.

As a countermeasure of such a problem, Japanese Patent Application Laid-Open No. 2009-229495 proposes a process cartridge that combines emulsion aggregation toner with a photosensitive member having a surface protective layer (hereinafter also referred to as "protective layer") containing specific electroconductive particles. In Japanese Patent Application Laid-Open No. 2009-229495, the image flow in high temperature and high humidity environments is improved by stabilizing the charging characteristics of the photosensitive member and improving the mechanical strength thereof, and such a scheme is considered to be also effective in inhibiting fogging.

However, according to the investigation of the present inventors, it was not possible to improve the deterioration of gradation under high temperature and high humidity conditions even with the configuration described in Japanese Patent Application Laid-Open No. 2009-229495. This is conjectured because the charging characteristics of the protective layer of the photosensitive member were not appropriate. In order to obtain an image with excellent gradation, the characteristics and content of the electroconductive particles in the protective layer are considered to still have room for improvement.

Then, an object of the present disclosure is to provide a process cartridge that inhibits fogging regardless of usage environment, and is capable of forming an image with excellent gradation.

SUMMARY OF THE INVENTION

The process cartridge according to the present disclosure is a process cartridge that is detachable from a main body of an electrophotographic apparatus, the process cartridge having: an electrophotographic photosensitive member; and a development unit that has a toner storage portion accommodating toner and that supplies the toner to the surface of the electrophotographic photosensitive member, wherein the electrophotographic photosensitive member has a electroconductive support, and a photosensitive layer and a surface protective layer formed on the electroconductive support in this order, wherein the surface protective layer includes an electroconductive particle; the content of the electroconductive particle is 20.0% by volume or more and 70.0% by volume or less of a total volume of the surface protective layer; the surface protective layer has a volume resistivity of $1.0\times10^{9}$ Ω·cm or higher and $1.0\times10^{14}$ Ω·cm or lower; the toner accommodated in the toner storage portion has a toner particle containing a binder resin, and an external additive; the toner particle has at least one multivalent metal element selected from the group consisting of aluminum, magnesium, calcium and iron; and the total content of the multivalent metal elements in the toner particle, as measured by coupled induction plasma atomic emission spectrometry (ICP-AES), is 0.10 μmol/g or more and 1.25 μmol/g or less.

Further features of the present disclosure will become apparent from the following description of exemplary embodiments with reference to the attached drawings.

DESCRIPTION OF THE EMBODIMENTS

Figure 1:
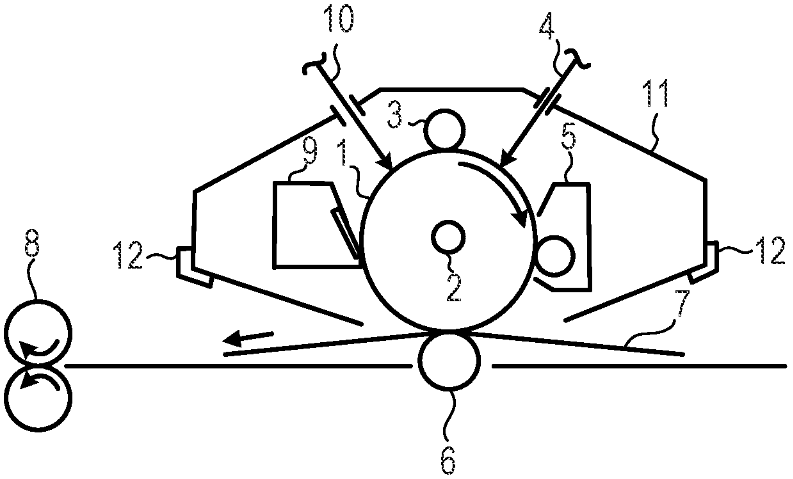
FIG. 1 is a schematic view of a process cartridge used to evaluate the toner in Example.

Preferred embodiments of the present disclosure will now be described in detail in accordance with the accompanying drawings.

In the present disclosure, the description of "XX or more and YY or less" or "XX to YY" refers to a numerical range including the lower limits and the upper limits that are endpoints unless otherwise specified.

The present disclosure will be described in detail below.

The present inventors have conducted diligent experimentation about the following (1), (2) and (3) in toner containing toner particles in which multivalent metallic elements are present, from an initial stage to an end of long-term continuous use, (1) excellent gradation can be obtained under high temperature and high humidity environments;

(2) no fogging occurs in high temperature and high humidity environments; and (3) no fogging occurs due to charge-up in low temperature and low humidity environments.

As a result, it has been found that an image inhibiting fogging regardless of a usage environment with excellent gradation can be formed and achieved by a process cartridge having a photosensitive member, a toner storage portion accommodating toner, and a development unit that supplies the toner to a surface of the photosensitive member, wherein the photosensitive member has an electroconductive support, and a photosensitive layer and a surface protective layer formed on the electroconductive support in this order; and the surface protective layer contains an electroconductive particle; the content of the electroconductive particle is 20.0% by volume or more and 70.0% by volume or less of a total volume of the surface protective layer; the surface protective layer has a volume resistivity of $1.0\times10^{9}$ Ω·cm or higher and $1.0\times10^{14}$ Ω·cm or lower;

the toner accommodated in the toner storage portion has a toner particle containing a binder resin, and an external additive; the toner particle has at least one multivalent metal element selected from the group consisting of aluminum, magnesium, calcium and iron; and a total content of the multivalent metal elements in the toner particle, as measured by coupled induction plasma atomic emission spectrometry (ICP-AES), is 0.10 μmol/g or more and 1.25 μmol/g or less.

The reasons why the effect of the present disclosure is exhibited according to the above are conjectured as follows.

Gradation of an image is expressed by increasing or decreasing an amount of toner per unit area developed on a photosensitive member in a process cartridge, thereby producing differences in gradation of color. The amount of the toner developed is controlled by the potential of an electrostatic latent image formed on a photosensitive member surface and the electric charge amount of the toner, and it is important for the toner to have a high electric charge amount and a sharp distribution of the electric charge amount in order to obtain excellent gradation. For example, in high temperature and high humidity environments where the moisture content in the air is high, the electric charge amount of the toner is prone to decrease, and the amount of the toner developed on the photosensitive member tends to increase, making it difficult to produce differences in gradation of color in response to subtle differences in the potential of the electrostatic latent image. Moreover, it becomes difficult to control a concentration of a low concentration image, particularly such as a halftone image, and when potential of the electrostatic latent image falls at or below a certain value, the toner suddenly reduces its developability, thereby facilitating a phenomenon of extremely reducing an image density to occur.

The present inventors enabled a small portion of charge on a photosensitive member surface to be injected into toner upon development by containing electroconductive particles in a surface protective layer of the photosensitive member in an appropriate amount and by controlling a volume resistivity of the protective layer. Furthermore, for the toner as well, balance between injectivity of charge and leakageability of charge was appropriately controlled by controlling the amount of the multivalent metal elements present in the toner particle. In addition thereto, the present inventors have found that combination of above these allows a small portion of charge on the photosensitive member surface to be injected into the toner upon development, enabling a high electric charge amount of the toner and a sharp distribution of electric charge amount. This has enabled a process cartridge capable of obtaining an image with excellent gradation regardless of usage environment and inhibiting generation of fogging even after long term use.

The photosensitive member according to the present disclosure has an electroconductive support, and a photosensitive layer and a protective layer that is a surface layer. The protective layer contains an electroconductive particle, and a content of the electroconductive particle is 20.0% by volume or more and 70.0% by volume or less of a total volume of the protective layer. Further, the surface protective layer is characterized in having a volume resistivity of $1.0\times10^{9}$ Ω·cm or higher and $1.0\times10^{14}$ Ω·cm or lower. Although the protective layer contains many electroconductive particles, the volume resistivity is maintained relatively high, which allows charge to be injected to the toner of the present disclosure through the electroconductive particles while still ensuring charge retentivity.

The content of the electroconductive particles less than 20.0% by volume reduces charge injectability into the toner of the present disclosure, resulting in a low electric charge amount of the toner upon development and facilitating reduction of gradation and generation of fogging. On the other hand, the content of the electroconductive particles exceeding 70% renders the protective layer itself brittle, facilitating the surface of the photosensitive member to be scraped through long term use. This results in reduction of charging uniformity of the photosensitive member, facilitating reduction of gradation and generation of fogging. The content of the electroconductive particles is more preferably 40.0% by volume or more and 70.0% by volume or less of the protective layer.

Moreover, the protective layer is characterized in having a volume resistivity of $1.0\times10^{9}$ Ω·cm or higher and $1.0\times10^{14}$ Ω·cm or lower. The volume resistivity of the protective layer less than $1.0\times10^{9}$ Ω·cm reduces resistance of the protective layer too low, making it difficult to maintain potential and facilitating reduction of tonal degradation. The volume resistivity of the protective layer exceeding $1.0\times10^{14}$ Ω·cm enhances resistance of the protective layer too high, extremely deteriorating injection chargeability to the toner.

The protective layer more preferably has a volume resistivity of $1.0\times10^{10}$ Ω·cm or higher and $1.0\times10^{14}$ Ω·cm or lower. The volume resistivity of the protective layer can be controlled, for example, by a particle size of the electroconductive particle. The particle size of the electroconductive particle is preferably 40 nm or larger and 300 nm or smaller as a number-average particle size and more preferably 100 nm or larger and 250 nm or smaller. In the case of the number-average particle size of the electroconductive particles being less than 40 nm, a specific surface area of the electroconductive particle becomes larger, and moisture adsorption is enhanced in the vicinity of the electroconductive particle on the surface of the protective layer, facilitating reduction of volume resistivity of the protective layer. The number-average particle size of the electroconductive particles exceeding 300 nm not only deteriorates dispersion of the particles in the protective layer but also reduces an interface area with a binder resin, increasing resistance at interface and facilitating deterioration of charge injectability.

Figure 4:
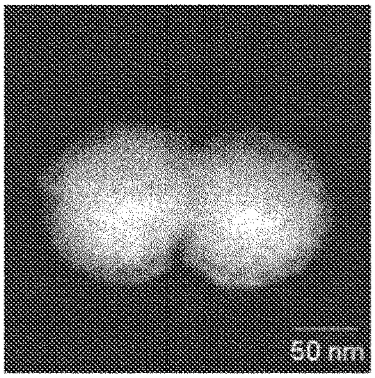
FIG. 4 is a STEM image illustrating an example of the niobium-containing titanium oxide used in Example.

Examples of the electroconductive particle contained in the protective layer include metal oxide particles such as titanium oxide, zinc oxide, tin oxide and indium oxide with titanium dioxide being preferred among them. In particular, an anatase type of titanium oxide renders charge transfer within the protective layer smooth, allowing for favorable charge injection. The anatase type of titanium oxide preferably has a degree of anatase of 90% or more. The metal oxide particle may be doped with atoms such as niobium, phosphorus and aluminum or oxides thereof, and a titanium oxide particle that contains niobium and has a composition of unevenly distributing niobium in the vicinity of the particle surface, is particularly preferred. The uneven distribution of niobium in the vicinity of the surface allows for efficient charge transfer. More specifically, the titanium oxide particle is a titanium oxide particle in which a concentration ratio determined as a niobium atom concentration/a titanium atom concentration at 5% inside of the maximum diameter of the particle measured from the surface of the particle, is 2.0 times or more a concentration ratio of a niobium atom concentration/a titanium atom concentration at the center of the particle. It is noted that the niobium atom concentration and titanium atom concentration are obtained by EDS analysis with a scanning transmission electron microscope (STEM). FIG. 4 illustrates a STEM image of an example of the niobium-containing titanium oxide particle used in Example of the present disclosure. As will be described in detail below, the niobium-containing titanium oxide particle used in Example is fabricated by coating a titanium oxide particle to be a core with niobium-containing titanium oxide and then calcinating the coated core. Therefore, the coated niobium-containing titanium oxide is conjectured to grow as niobium-doped titanium oxide by so-called epitaxial growth along crystals of the titanium oxide core. The titanium oxide containing niobium thus fabricated is in the control of core-shell morphology with a smaller density in the vicinity of the surface, compared to a density in the center of the particle, as illustrated in FIG. 4.

Figure 5:
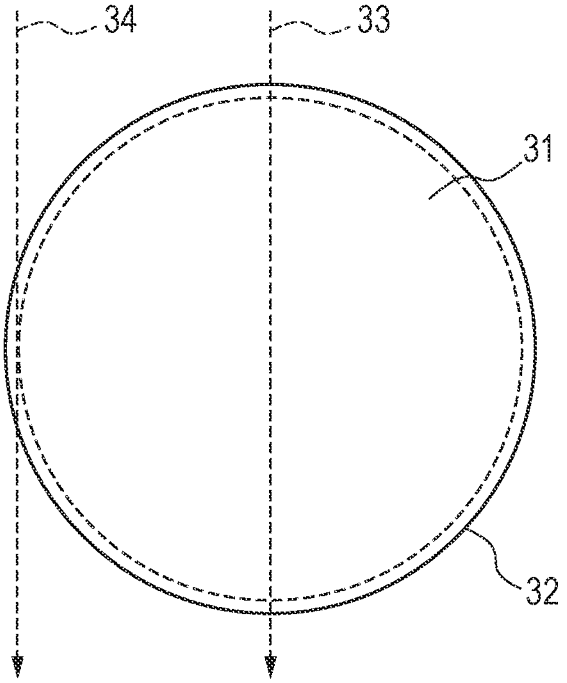
FIG. 5 is a schematic view illustrating an example of the niobium-containing titanium oxide used in Example.

The STEM image of FIG. 4 is schematically illustrated in FIG. 5. Such a niobium-containing titanium oxide particle has an atom concentration ratio of niobium/titanium in the vicinity of the surface of the particle larger than an atom concentration ratio of niobium/titanium in the center of the particle, and niobium atoms are unevenly distributed in the vicinity of the particle surface. Specifically, a concentration ratio of niobium atoms/titanium atoms at 5% inside of the maximum diameter of a particle measured from the surface of the particle, is 2.0 times or more a concentration ratio of niobium atoms/titanium atoms at the center of the particle. The ratio of 2.0 times or more facilitates movement of charge in the protective layer and enhances charge injectability. The ratio less than 2.0 times renders transfer of charge difficult.

In FIG. 5, a sign 31 indicates a center of an electroconductive particle, a sign 32 indicates the vicinity of the surface of the electroconductive particle, and a sign 33 denotes X-rays analyzing the center of the electroconductive particle, and a sign 34 denotes X-rays analyzing a position at 5% inside of the particle diameter from the surface of the electroconductive particle.

The content of niobium atoms is preferably 0.5% by mass or more and 15.0% by mass or less relative to the niobium atoms-containing titanium oxide particles and more preferably 2.6% by mass or more and 10.0% by mass or less.

The toner according to the present disclosure will be described below.

The toner according to the present disclosure has a toner particle containing a binder resin, and an external additive, and the toner particle has at least one multivalent metal element selected from the group consisting of aluminum, magnesium, calcium and iron. Moreover, a total content of the multivalent metal elements in the toner particle, as measured by coupled induction plasma atomic emission spectrometry (ICP-AES), is characterized in being 0.10 μmol/g or more and 1.25 μmol/g or less.

The toner particle contains at least one multivalent metal element selected from the group consisting of aluminum, magnesium, calcium and iron as an injection site for injecting electric charge from the photosensitive member. Each electrical resistivity of these metal elements at 20° C. is $2.7\times10^{-8}$ Ω·m for aluminum, $4.2\times10^{-8}$ Ω·m for calcium, $4.5\times10^{-8}$ Ω·m for magnesium, and $9.7\times10^{-8}$ Ω·m for iron (cited from "Chemistry Handbook, Fundamentals-II" (Revised $4^{th}$ ed., published by The Chemical Society of Japan, Maruzen, 1993, p. 490)). The present inventors have confirmed that these metal elements exhibit stable charge injectability and charge retentivity by allowing them to be contained in appropriate amounts in the toner. Although not used in the toner according to the present disclosure, for reference, the metal elements with lower electrical resistance are copper with $1.7\times10^{-8}$ Ω·m and silver $1.6\times10^{-8}$ Ω·m (cited from "Chemistry Handbook, Fundamentals-II" (Revised $4^{th}$ ed., published by The Chemical Society of Japan, Maruzen, 1993, p. 490)).

At least one multivalent metal element selected from the group consisting of aluminum, magnesium, calcium and iron in the toner particle, which has a content of 0.10 μmol/g or more and 1.25 μmol/g or less allows injection chargeability from the photosensitive member to the toner to be exhibited and enables an image with excellent gradation to be obtained in combination with the photosensitive member of the present disclosure. In the case of the content of the multivalent metal element being less than 0.10 μmol/g, the injectivity of charge is significantly reduced, whereby charge is not imparted to the toner and excellent gradation cannot be obtained. In addition, the toner is apt to be charged up, which thereby facilitates broadening of electric charge amount distribution of the toner in low temperature and low humidity environments and then causes fogging. In a case in which the content of the multivalent metal element exceeding 1.25 μmol/g, the charge injectability is excellent, however, the charge is conversely prone to leak, facilitating deterioration of gradation and fogging.

The more detailed content of each aforementioned multivalent metal element is 0.50 μmol/g or less and more preferably 0.10 μmol/g or more and 0.32 μmol/g or less for aluminum. For magnesium, it is 0.80 μmol/g or less, for calcium, it is 0.90 μmol/g or less, and for iron, it is 1.25 μmol/g or less, and a total content of these four multivalent metal elements is preferably 0.10 μmol/g or more and 1.25 μmol/g or less. The reason why the range of the content of each preferred multivalent metal element differs depending on the substance is considered to be related to a resistance value of the metal. Among the above, aluminum has low electrical resistance and exhibits excellent injectivity even with a small amount, which is preferred.

The multivalent metal element is preferably present in dispersed form on the toner particle surface and inside the toner particle. The presence of the multivalent metal element also inside the toner particle allows charge imparted to the toner particle surface to accumulate inside as well. In the case of allowing the above multivalent metal element to be present only on the toner particle surface, such as by externally adding a metal oxide particle to the toner particle, the injected charge leaks through a member such as a toner carrier due to the extremely high leakageability, making it difficult to achieve a desired effect. Furthermore, the external additive is embedded on the surface of the toner or fallen off through long term use, which thereby may facilitate fluctuations in charging characteristics of the toner and render it difficult to obtain an image of stable quality.

A unit of rendering the multivalent metal element present inside the toner particle is preferably a unit of producing a toner particle by the emulsion aggregation method and allowing the multivalent metal element to be contained inside the particle via an aqueous medium. The emulsion aggregation method allows the metal element that underwent ionization thereof in an aqueous medium to be contained in the toner particle, thereby enabling a homogeneous dispersion of the metal element. Furthermore, in emulsion aggregation toner, a carboxy group is generally present in a molecular chain constituting the binder resin. A metal ion added as an aggregation agent forms a coordination bond with the carboxy group, enabling an excellent electroconductive path to be formed on the resin fine particle. In this case, trivalent aluminum can coordinate with the carboxy group in a smaller amount than divalent magnesium and calcium as well as iron that can have mixed valence, and exhibit superior electric charge injectability.

The toner according to the present disclosure may contain wax. Publicly known substances can be used as wax, and examples thereof include aliphatic hydrocarbon-based wax such as a low molecular weight polyethylene, low molecular weight polypropylene, microcrystalline wax, paraffin wax and Fischer-tropsch wax, oxides of aliphatic hydrocarbon wax such as oxidized polyethylene wax or block copolymers thereof, waxes in which aliphatic hydrocarbon wax is grafted with a vinyl monomer such as styrene or acrylic acid, saturated fatty acid ester compounds, such as stearyl stearate, behenyl behenate, dibehenyl sebacate, distearyl dodecanedioic acid, distearyl octadecanedioic acid, nonanediol dibehenate, ethylene glycol distearate, ethylene glycol dibehenate, butanediol dibehenate, butanediol distearate, pentaerythritol tetrabehenate, and dipentaerythritol hexastearate. Among them, the ester compounds have the ability to assist charge injection into the toner particle due to their higher polarity and lower electrical resistance than hydrocarbon-based wax.

The composition of the photosensitive member according to the present disclosure will be described in detail below.

<Protective Layer>

In the case of the protective layer being a surface layer, the electroconductive particles according to the present disclosure are contained on the surface of the protective layer. The protective layer may contain a polymer or a resin of a compound having a polymerizable functional group. Examples of the polymerizable functional group include an isocyanate group, blocked isocyanate group, methylol group, alkylated methylol group, epoxy group, metal alkoxide group, hydroxyl group, amino group, carboxy group, thiol group, carboxylic anhydride group, carbon-carbon double bond group, alkoxysilyl group, and silanol group. A monomer with charge transportability may be used as the compound having a polymerizable functional group. The compound having a polymerizable functional group may have a charge transport structure as well as a chain polymerizable functional group.

Examples of the resin include a polyester resin, acrylic resin, phenoxy resin, polycarbonate resin, polystyrene resin, phenol resin, melamine resin, and epoxy resin. Among them, the polycarbonate resin, polyester resin, and acrylic resin are preferred. Moreover, the protective layer may be formed as a cured film by polymerizing a composition containing a monomer having a polymerizable functional group. Examples of reaction in this case include thermal polymerization reaction, photopolymerization reaction, and radiation polymerization. Examples of a polymerizable functional group of a monomer having the polymerizable functional group include an acryloyl group and a methacryloyl group. As the monomer having a polymerizable functional group, a material with charge transportability may be used.

The protective layer can be formed by preparing a coating solution for the protective layer containing each of the above materials and solvents, forming this coating film on the photosensitive layer, and drying and/or curing it. The solvents used in the coating solution include alcohol-based solvents, ketone-based solvents, ether-based solvents, sulfoxide-based solvents, ester-based solvents and aromatic hydrocarbon-based solvents.

The protective layer may contain an additive such as an antioxidant, UV absorber, plasticizer, leveling agent, slippery-imparting agents, or abrasion resistance improver. Specifically, a hindered phenol compound, hindered amine compound, sulfur compound, phosphorus compound, benzophenone compound, siloxane modified resin, silicone oil, fluoropolymer particles, polystyrene resin particles, polyethylene resin particles, silica particles, alumina particles, boron nitride particles and the like.

An average thickness of the protective layer is preferably 0.2 μm or more and 5 μm or less and more preferably 0.5 μm or more and 3 μm or less.

A material and the particle size of the electroconductive particle contained in the protective layer are as described above.

<Electroconductive Support>

The photosensitive member according to the present disclosure has an electroconductive support having conductivity. Examples of a shape of the support include shapes such as a cylindrical, belt-like, and sheet-like shapes with a cylindrical support being preferred among them. Further, a surface of the support may be subjected to electrochemical treatment such as anodic oxidation, blast treatment, or cutting treatment. Metal, resin, and glass are preferred as materials for the support. Examples of the metal include aluminum, iron, nickel, copper, gold, stainless steel, alloys thereof. Among them, a support made of aluminum is preferred. Moreover, conductivity is preferably imparted to the resin and glass by treatment such as mixing or coating them with an electroconductive material.

<Electroconductive Layer>

In the photosensitive member according to the present disclosure, a electroconductive layer may be arranged on the support. The electroconductive layer arranged can hide scratches and a concave and convex on the surface of the support and control reflection of light on the surface of the support. The electroconductive layer preferably contains an electroconductive particle and a resin. Examples of the electroconductive particle include a metal oxide, metal, and carbon black. Examples of the metal oxide include zinc oxide, aluminum oxide, indium oxide, silicon oxide, zirconium oxide, tin oxide, titanium oxide, magnesium oxide, antimony oxide and bismuth oxide. Examples of the metals include aluminum, nickel, iron, nichrome, copper, zinc and silver. Among them, the metal oxide is preferably used as the electroconductive particle and particularly titanium oxide, tin oxide and zinc oxide are preferred.

In the case of using the metal oxide as the electroconductive particle, a surface of the metal oxide may be treated with a silane coupling agent or the like, or the metal oxide may be doped with elements such as niobium, phosphorus, aluminum or oxides thereof. Particularly preferred is a metal oxide with niobium atoms unevenly distributed on or in the vicinity of the surface of the titanium oxide particle.

Moreover, in a case in which the metal oxide is used as the electroconductive particle, the number-average particle size of the metal oxide is preferably 1 nm or larger and 500 nm or smaller and more preferably 3 nm or larger and 400 nm or smaller.

Examples of the resin include a polyester resin, polycarbonate resin, polyvinyl acetal resin, acrylic resin, silicone resin, epoxy resin, melamine resin, polyurethane resin, phenol resin and alkyd resin. In addition, the electroconductive layer may further contain silicone oil, resin particles, masking agents such as titanium oxide, and the like.

The electroconductive layer can be formed by preparing a coating solution for the electroconductive layer containing each of the above materials and solvents, forming this coating film on the support and drying it. Examples of the solvent used in the coating solution include an alcohol-based solvent, sulfoxide-based solvent, ketone-based solvent, ether-based solvent, ester-based solvent, and aromatic hydrocarbon-based solvent. A method for dispersing electroconductive particles in the coating solution for the electroconductive layer includes methods using a paint shaker, sand mill, ball mill and liquid impact type high-speed disperser.

An average thickness of the electroconductive layer is preferably 1 μm or more and 40 μm or less and particularly preferably 3 μm or more and 30 μm or less.

<Undercoat Layer>

In the photosensitive member of the present disclosure, an undercoat layer may be arranged on the support or the electroconductive layer. The undercoat layer arranged enhances an adhesive function between layers and can impart a charge injection blocking function. The undercoat layer preferably contains a resin. In addition, the undercoat layer may be formed as a cured film by polymerizing a composition containing a monomer having a polymerizable functional group.

Examples of the resin include a polyester resin, polycarbonate resin, polyvinyl acetal resin, acrylic resin, epoxy resin, melamine resin, polyurethane resin, phenol resin, polyvinyl phenol resin, alkyd resin, polyvinyl alcohol resin, polyethylene oxide resin, polypropylene oxide resin, polyamide resin, polyamide acid resin, polyimide resin, polyamideimide resin and cellulose resin.

Examples of a polymerizable functional group of a monomer having the polymerizable functional group, include an isocyanate group, blocked isocyanate group, methylol group, alkylated methylol group, epoxy group, metal alkoxide group, hydroxyl group, amino group, carboxy group, thiol group, carboxylic acid anhydride group and carbon-carbon double bond group.

Moreover, the undercoat layer may further contain an electron transport substance, metal oxide, metal, electroconductive polymer, and the like for the purpose of enhancing electrical properties. Among them, the electron transport substance and metal oxide are preferred.

Examples of the electron transport substance include a quinone compound, imide compound, benzimidazole compound, cyclopentadienylidene compound, fluorenone compound, xanthone compound, benzophenone compound, cyanovinyl compound, aryl halide compound, silole compound and boron-containing compound. The undercoat layer may be formed as a cured film by using an electron transport substance having a polymerizable functional group as the electron transport substance and copolymerizing with the monomer having a polymerizable functional group as described above.

The metal oxides include indium tin oxide, tin oxide, indium oxide, titanium oxide, zinc oxide, aluminum oxide and silicon dioxide. The metals include gold, silver and aluminum.

A metal oxide particle contained in the undercoat layer may be surface treated by using a surface treatment agent such as a silane coupling agent. A method for surface treating the metal oxide particle employs general methods. For example, a dry method and a wet method are included.

The dry method is a method for adding an aqueous alcohol solution, organic solvent solution, or aqueous solution containing the surface treatment agent while stirring the metal oxide particles in a high-speed mixer such as a Henschel mixer, homogeneously dispersing the mixture, and then drying it.

Further, the wet method is a method for stirring the metal oxide particles and the surface treatment agent in a solvent, or dispersing the mixture with a sand mill or the like by using glass beads or the like, and after dispersion, the solvent is removed by filtration or vacuum distillation. After removal of the solvent, baking is preferably carried out at 100° C. or higher.

The undercoat layer may further contain an additive and for example, metal powder such as aluminum, electroconductive materials such as carbon black, and publicly known materials such as a charge transport substance, metal chelate compound and organometallic compound, can be contained.

Examples of the charge transport substance include a quinone compound, imide compound, benzimidazole compound, cyclopentadienylidene compound, fluorenone compound, xanthone compound, benzophenone compound, cyanovinyl compound, aryl halide compound, silole compound and boron-containing compound. A charge transport substance having a polymerizable functional group may be used as the charge transport substance and copolymerized with the aforementioned monomer having a polymerizable functional group to form the undercoat layer as a cured film.

The undercoat layer can be formed by preparing a coating solution for the undercoat layer containing each of the above materials and solvents, forming this coating film on the support or electroconductive layer, and drying and/or curing it.

Examples of the solvent used for the coating solution for the undercoat layer include organic solvents such as an alcohol, sulfoxide, ketone, ether, ester, aliphatic halogenated hydrocarbon and aromatic compound. In the present disclosure, alcohol-based and ketone-based solvents are preferred for use.

Dispersion methods for preparing the coating solution for the undercoat layer include methods using a homogenizer, ultrasonic disperser, ball mill, sand mill, roll mill, vibration mill, attritor and liquid impact type high-speed disperser.

An average thickness of the undercoat layer is preferably 0.1 μm or more and 10 μm or less and more preferably 0.1 μm or more and 5 μm or less.

<Photosensitive Layer>

The photosensitive layer of the photosensitive member according to the present disclosure is mainly classified into (1) a stacked type photosensitive layer and (2) a monolayer type photosensitive layer. The stacked type photosensitive layer (1) is a photosensitive layer having a charge generation layer containing a charge generating substance and a charge transport layer containing a charge transport substance. The monolayer type photosensitive layer (2) is a photosensitive layer that contains both the charge generating substance and the charge transport substance.

(1) Stacked Type Photosensitive Layer

The stacked type photosensitive layer has the charge generation layer and the charge transport layer.

(1-1) Charge Generation Layer

The charge generation layer preferably contains the charge generating substance and a resin.

Examples of the charge generating substance include azo pigments, perylene pigments, polycyclic quinone pigments, indigo pigments and phthalocyanine pigments. Among them, the azo pigments and phthalocyanine pigments are preferred. Among phthalocyanine pigments, an oxytitanium phthalocyanine pigment, chlorogallium phthalocyanine pigment and hydroxygallium phthalocyanine pigment are preferred.

The content of the charge generating substance in the charge generation layer is preferably 40% by mass or more and 85% by mass or less of the total mass of the charge generation layer and more preferably 60% by mass or more and 80% by mass or less.

The resins include a polyester resin, polycarbonate resin, polyvinyl acetal resin, polyvinyl butyral resin, acrylic resin, silicone resin, epoxy resin, melamine resin, polyurethane resin, phenol resin, polyvinyl alcohol resin, cellulose resin, polystyrene resin, polyvinyl acetate resin and polyvinyl chloride resin. Among them, the polyvinyl butyral resin is more preferred.

Moreover, the charge generation layer may further contain additives such as an antioxidant and UV absorber. Specifically, a hindered phenol compound, hindered amine compound, sulfur compound, phosphorus compound and benzophenone compound, are included.

The charge generation layer can be formed by preparing a coating solution for the charge generation layer containing each of the above materials and solvents, forming this coating film on the support, electroconductive layer or undercoat layer, and drying it. Solvents used in the coating solution include an alcohol-based solvent, sulfoxide-based solvent, ketone-based solvent, ether-based solvent, ester-based solvent and aromatic hydrocarbon-based solvent.

An average thickness of the charge generation layer is preferably 0.1 μm or more and 1 μm or less and more preferably 0.15 μm or more and 0.4 μm or less.

(1-2) Charge Transport Layer

The charge transport layer preferably contains the charge transport substance and a resin.

Examples of the charge transport substance include a polycyclic aromatic compound, heterocyclic compound, hydrazone compound, styryl compound, enamine compound, benzidine compound, triarylamine compound and resin having a group derived from these substances. Among them, the triarylamine compound and benzidine compound are preferred.

The content of the charge transport substance in the charge transport layer is preferably 25% by mass or more and 70% by mass or less relative to the total mass of the charge transport layer and more preferably 30% by mass or more and 55% by mass or less.

The resins include a polyester resin, polycarbonate resin, acrylic resin and polystyrene resin. Among them, the polycarbonate resin and polyester resin are preferred. As the polyester resin, a polyarylate resin is particularly preferred.

A content ratio (mass ratio) of the charge transport substance and the resin is preferably 4:10 to 20:10 and more preferably 5:10 to 12:10.

Further, the charge transport layer may also contain additives such as an antioxidant, UV absorber, plasticizer, leveling agent, slippery-imparting agent and abrasion resistance improver. Specifically, a hindered phenol compound, hindered amine compound, sulfur compound, phosphorus compound, benzophenone compound, siloxane modified resin, silicone oil, fluoropolymer particles, polystyrene resin particles, polyethylene resin particles, silica particles, alumina particles and boron nitride particles, are included.

The charge transport layer can be formed by preparing a coating solution for the charge transport layer containing each of the above materials and solvents, forming this coating film on the charge generation layer, and drying it. The solvents used in the coating solution include an alcohol-based solvent, ketone-based solvent, ether-based solvent, ester-based solvent and aromatic hydrocarbon-based solvent. Among these solvents, the ether-based solvent or aromatic hydrocarbon-based solvent is preferred.

An average thickness of the charge transport layer is preferably 3 μm or more and 50 μm or less, more preferably 5 μm or more and 40 μm or less, and particularly preferably 10 μm or more and 30 μm or less.

(2) Monolayer Type Photosensitive Layer

The monolayer type photosensitive layer can be formed by preparing a coating solution for a photosensitive layer containing a charge generating substance, charge transport substance, resin and solvent, forming this coating film on the support, the electroconductive layer or the undercoat layer and drying it. The charge generating substance, charge transport substance and resin are the same as the examples of the materials in "(1) Stacked type photosensitive layer" above.

Hereinafter, the binder resin, wax as a releasing agent, coloring agent, charge control agent, and external additive, which constitute the toner of the present disclosure, will be described in detail.

<Binder Resin>

The binder resin for the toner according to the present disclosure is not particularly limited, and publicly known binder resins can be used, and a vinyl-based resin, polyester resin and the like are preferred. The following resins or polymers are exemplified as the vinyl resin, polyester resin and other binder resin.

Examples thereof include a homopolymer of styrene and a substitute thereof, such as polystyrene and polyvinyltoluene; styrene-based copolymers, such as a styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer, styrene-maleic acid ester copolymer;

polymethyl methacrylate, polybutyl methacrylate, polyvinyl acetate, polyethylene, polypropylene, polyvinyl butyral, silicone resin, polyamide resin, epoxy resin, polyacrylic resin, rosin, modified rosin, terpene resin, phenol resin, aliphatic or alicyclic hydrocarbon resin, aromatic-based petroleum resin. These binder resins can be used singly or in admixture. Preferably, it is the styrene-based copolymers.

As described above, these binder resins containing carboxy groups coordinate with polyvalent metal ions to form an excellent electroconductive path, which is preferred.

Examples of the polymerizable monomer containing a carboxy group include acrylic acid, methacrylic acid; α-alkyl derivatives or β-alkyl derivatives of acrylic acid or methacrylic acid, such as α-ethyl acrylic acid and crotonic acid; unsaturated dicarboxylic acids, such as fumaric acid, maleic acid, citraconic acid and itaconic acid; and unsaturated dicarboxylic acid monoester derivatives, such as succinic acid monoacryloyloxyethyl ester, succinic acid monoacryloyloxyethylene ester, phthalic acid monoacryloyloxyethyl ester, and phthalic acid monomethacryloyloxyethyl ester.

A polyester resin in which the carboxylic acid component and the alcohol component listed below underwent condensation polymerization, can be used.

Examples of the carboxylic acid components include terephthalic acid, isophthalic acid, phthalic acid, fumaric acid, maleic acid, cyclohexane dicarboxylic acid and trimellitic acid. The alcohol components include bisphenol A, a hydrogenated bisphenol, ethylene oxide adduct of bisphenol A, propylene oxide adduct of bisphenol A, glycerin, trimethylolpropane and pentaerythritol.

Moreover, the polyester resin may also be a polyester resin containing a urea group. The polyester resin is preferably a polyester resin with a carboxy group such as the end not being capped.

<Wax>

The toner according to the present disclosure may contain wax as a releasing agent. The wax suitably used is as described above. The content of the wax is 5.0 parts by mass or more and 20.0 parts by mass or less relative to 100.0 parts by mass of the binder resin or a polymerizable monomer producing the binder resin.

<Coloring Agent>

The coloring agent is not particularly limited, and any publicly known coloring agent can be used.

As a yellow pigment, azo fused compounds, such as yellow iron oxide, Naples yellow, Naphthol yellow S, Hansa Yellow G, Hansa Yellow 10G, Benzidine Yellow G, Benzidine Yellow GR, Quinoline Yellow Lake, Permanent Yellow NCG, Tartrazine Lake, an isoindolinone compound, anthraquinone compound, azometal complex, methine compound and allylamide compound, are used Specifically, the following is included:

C.I. pigment yellow 12, 13, 14, 15, 17, 62, 74, 83, 93, 94, 95, 109, 110, 111, 128, 129, 147, 155, 168, 180, 185 and 193.

Red pigments include azo fused compounds such as bengalla, Permanent Red 4R, Lysol Red, Pyrazolone Red, watching red calcium salt, Lake Red C, Lake Red D, Brilliant Carmine 6B, Brilliant Carmine 3B, Eosine Lake, Rhodamine Lake B, Alizarin Lake, a diketopyrrolopyrrole compound, anthraquinone compound, quinacridone compound, basic dye lake compound, naphthol compound, benzimidazolone compound, thioindigo compound and perylene compound. Specifically, the following are included: C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221 and 254.

Blue pigments include copper phthalocyanine compounds such as alkali blue lake, Victoria Blue lake, phthalocyanine blue, metal-free phthalocyanine blue, phthalocyanine blue partial chloride, first sky blue, indanthrene blue BG and derivatives thereof, an anthraquinone compound and basic dye lake compound. Specifically, the following are included: C. I. Pigment Blue 1, 7, 15, 1 5:1, 15:2, 15:3, 15:4, 60, 62 and 66.

Black pigments include carbon black, aniline black, non-magnetic ferrite, magnetite, and those toned to black by using the above yellow-based coloring agents, red-based coloring agents and blue-based coloring agents. These coloring agents can be used singly or in admixture, or even in solid solution.

The coloring agents may be surface treated with a substance that does not prevent polymerization, if necessary. It is noted that the content of the coloring agent is 3.0 parts by mass or more and 15.0 parts by mass or less, relative to 100.0 parts by mass of the binder resin or a polymerizable monomer that produces the binder resin.

<Charge Control Agent>

The toner according to the present disclosure may contain a charge control agent. As the charge control agent, any publicly known charge control agent may be used. A charge control agent that enables rapid charge and a constant and stable electric charge amount to be maintained, is preferred. Furthermore, in the case of producing a toner particle by a direct polymerization method, a charge control agent with low polymerization inhibition and practically no solubilization in an aqueous medium is preferred. The charge control agents that control the toner particle to be in negative charge include those listed below.

Organometallic compounds and chelate compounds include a monoazometallic compound, acetylacetone metallic compound, aromatic oxycarboxylic acid, aromatic dicarboxylic acid, oxycarboxylic acid or dicarboxylic acid-based metallic compound. Other organometallic compounds and chelate compounds include an aromatic oxycarboxylic acid, aromatic mono- and polycarboxylic acids, and metal salts, anhydrides or esters thereof, and phenol derivatives such as bisphenol as well. Furthermore, a urea derivative, metal-containing salicylic acid compound, metal-containing naphthoic acid compound, boron compound, quaternary ammonium salt and calixarene.

These charge control agents can be contained singly or in combination of two or more types. The amount of charge control agent added is 0.01 parts by mass or more and 10.0 parts by mass or less, relative to 100.0 parts by mass of the binder resin.

<External Additive>

The toner according to the present disclosure may contain an external additive for the purpose of improving flowability, chargeability, blocking properties and the like.

Examples of the external additive include inorganic microparticles such as a silica microparticle, alumina microparticle, and titanium oxide microparticle. They can be used singly or in combination of two or more thereof. These inorganic microparticles are preferably surface treated with a silane coupling agent, titanium coupling agent, higher fatty acid, silicone oil or the like in order to improve heat storage resistance and environmental stability.

A BET specific surface area of the external additive is preferably 10.0 $m^2/g$ or larger and 450.0 $m^2/g$ or smaller. The BET specific surface area is determined according to a BET method (preferably a BET multipoint method) according to a low-temperature gas adsorption method using a dynamic constant pressure method. The BET specific surface area ($m^2$/g) can be calculated by using, for example, a specific surface area measuring apparatus (product name: Gemini 2375 Ver. 5.0, manufactured by Shimadzu Corporation), allowing a nitrogen gas to be adsorbed on a sample surface, and measuring a BET specific surface area by employing the BET multipoint method.

The amount of these various external additives is preferably 0.05 parts by mass or more and 5.0 parts by mass or less, relative to 100.0 parts by mass of the toner particle. A type and the content of the external additive can be selected as appropriate as long as the effect of the present disclosure is not hindered.

<Production Method of Toner Particle>

A method for producing a toner particle can use publicly known methods and a kneading and pulverization method and a wet production method can be used. The wet production method is preferred in terms of uniformity of particle size and shape controllability. Examples of the wet production method include a suspension polymerization method, dissolution suspension method, emulsion polymerization aggregation method, and emulsion aggregation method with the emulsion aggregation method being more preferred. Namely, the toner particle is preferably an emulsion aggregation toner particle. This is because the toner facilitates ionization of multivalent metal elements in an aqueous medium and also because the toner particle facilitates multivalent metal elements to be contained therein upon aggregation of the binder resin.

In the emulsion aggregation method, a toner particle is produced after a resin fine particle undergoes an emulsification step, aggregation step, fusion step, cooling step and washing step. Moreover, a shell formation step can be added after the cooling step to produce a core-shell toner, if necessary.

Emulsification Step of Resin Fine Particle

A resin fine particle composed mainly of the binder resin can be prepared by publicly known methods. For example, a resin particle dispersion can be prepared by dissolving the binder resin in an organic solvent and adding the mixture to an aqueous medium, dispersing the particles in the aqueous medium with a surfactant and a polyelectrolyte by using a disperser such as a homogenizer, and then removing the solvent by heating or reducing pressure. Any organic solvent can be used to dissolve the aforementioned resin, and tetrahydrofuran, ethyl acetate, chloroform or the like is preferred from the viewpoint of high solubility thereof.

Preferably to an aqueous medium are added the aforementioned resin, surfactant, base and the like to emulsify and disperse them in an aqueous medium substantially containing no organic solvent by a disperser that applies high-speed shear force, such as a CLEARMIX, homomixer, or homogenizer from the standpoint of environmental load.

Surfactants used upon emulsification are not particularly limited, and include, for example, the following: Anionic surfactants such as a sulfate ester salt-based, sulfonate-based, carboxylate-based, phosphate ester-based, and soap-based surfactants; cationic surfactants such as an amine salt type and quaternary ammonium salt type; nonionic-based surfactants such as a polyethylene glycol-based, alkyl phenol ethylene oxide adduct-based, polyhydric alcohol-based surfactants. One type of the surfactant may be used singly, two or more types thereof may be combined for use.

A median diameter based on volume distribution of the resin fine particle is preferably 0.05 to 1.0 μm and more preferably 0.05 to 0.4 μm. The diameter that is 1.0 μm or less facilitates a toner particle with a median diameter of 4.0 to 7.0 μm, which is an appropriate median diameter based on volume distribution as the toner particle, to be obtained. A median diameter based on volume distribution can be calculated by using a dynamic light scattering particle size analyzer (NANOTRAC UPA-EX1 50, manufactured by Nikkiso Co., Ltd.).

Aggregation Step

The aggregation step is a step of mixing the above resin fine particles, coloring agent particles, wax particles and the like, if necessary to prepare a mixed solution, and then allowing particles contained in the prepared mixed solution to be aggregated to form aggregates.

As an aggregation agent, inorganic salt and two or more divalent inorganic metal salt can be suitably used, in addition to the surfactants with inverted polarity of those as described above. In particular, the inorganic metal salt can be ionized by adding a multivalent metal element in an aqueous medium and easily forms a coordination bond with a carboxy group contained in the binder resin. This facilitates control of aggregating property and toner chargeability. Examples of preferred inorganic metal salt include metal salt of calcium chloride, calcium nitrate, barium chloride, magnesium chloride, zinc chloride, iron chloride, aluminum chloride or aluminum sulfate, and inorganic metal salt polymers such as polyiron chloride, polyaluminum chloride, and polyaluminum hydroxide. Among them, trivalent aluminum salt and a polymer thereof are particularly suitable. In general, the inorganic metal salt is preferably divalent rather than monovalent, and is preferably trivalent or higher than divalent in order to obtain a sharper particle size distribution.

Addition of the aggregation agent is not particularly limited, and it is preferably added at 25 to 35° C., and then is preferably heated and raised to a temperature at or below the glass transition temperature (Tg) of the resin particle. Mixing at or below the temperature of Tg inhibits fusion between resin particles and allows aggregation to proceed in a stable state. As a result, metal elements derived from the aggregation agent can uniformly form a coordination bond with a carboxy group in the resin. The mixing above can be carried out by using a publicly known mixing apparatus, such as homogenizer or mixer.

A weight-average particle size of the aggregate formed here is not particularly limited and is favorably controlled to be 4.0 μm to 7.0 μm so as to be substantially the same as that of a toner particle to be obtained. For example, the control can be easily achieved, for example, by appropriately setting or changing temperature upon addition and mixing of the above aggregation agent or the like and the conditions of the above stirring and mixing. It is noted that a particle size distribution of the toner particle can be measured by using a particle size distribution analyzer according to a Coulter method (Coulter Multisizer III manufactured by Beckman Coulter, Inc).

Fusion Step

The fusion step is a step of heating and fusing the above aggregate at or higher than the glass transition temperature (Tg) of the resin to produce a particle with a smoothed aggregate surface. Before the primary fusion step, a chelating agent, pH regulator, surfactant, or the like can be appropriately charged in order to prevent fusion between the toner particles.

Examples of the chelating agent include the following: Ethylenediaminetetraacetic acid (EDTA) and alkali metal salt of Na salt thereof and the like, sodium gluconate, sodium tartrate, potassium citrate and sodium citrate, nitrotriacetate (NTA) salt, and many water-soluble polymers (polyelectrolytes) containing both functional groups of COOH and OH.

A temperature in the above heating is preferably between the glass transition temperature (Tg) of the resin contained in the aggregate and a temperature at which the resin thermally decomposes. As for time for heating and fusion, the higher the heating temperature, the shorter the heating time, and the lower the heating temperature, the longer time is required. Namely, the time for heating and fusion depends on heating temperature, and cannot be generally specified, but generally ranges from 10 minutes to 10 hours.

Cooling Step

The cooling step is a step of cooling the aqueous medium containing the above particles to a temperature lower than the glass transition temperature (Tg) of the resin used. In the case of not cooling it to the temperature lower than Tg, a coarse particle may be generated. A specific cooling rate is 0.1 to 50° C./min.

Shell Formation Step

Moreover, a shell formation step can be employed before the following washing and drying step. The shell formation step is a step of newly adding and adhering a resin fine particle to the particle fabricated in the previous steps to form a shell.

The resin fine particle added here may have the same structure as the binder resin fine particle used for a core, or may have a different structure.

Washing and Drying Step

The particle fabricated through the above steps is washed and filtered with ion-exchanged water with a pH adjusted with sodium hydroxide or potassium hydroxide, followed by washing and filtration with ion-exchanged water multiple times. Thereafter, it is dried to obtain an emulsion aggregation toner particle.

<Production Method of Toner>

The toner according to the present disclosure may be such that the external additive is added to the toner particle. As an example of an external addition apparatus, a double cone mixer, V-type mixer, drum-type mixer, super mixer, FM mixer (manufactured by Nippon Coke & Engineering Co., Ltd.), Nauta mixer, Mechano Hybrid and the like can be used. In order to control a coating state of the external additive, the number of revolutions, treatment time, and water temperature and water volume of a jacket, in the aforementioned external addition apparatus are adjusted to enable toner to be prepared.

<Process Cartridge>

The process cartridge of the present disclosure has the photosensitive member as described so far, a toner storage portion accommodating toner, and a development unit that supplies the toner to the surface of the photosensitive member, and can be configured to be detachable from the main body of the electrophotographic apparatus.

FIG. 1 illustrates an example of a schematic configuration of an electrophotographic apparatus having the process cartridge according to the present disclosure.

A cylindrical (drum-shaped) photosensitive member 1 is driven to rotate around a shaft 2 at a predetermined peripheral speed (process speed) in the direction of the arrow. A surface of photosensitive member 1 is charged to a predetermined positive or negative potential by a charging unit 3 in the rotation process. It is noted that in FIG. 1, a roller charging method by using a roller-type charging member is illustrated, however, a charging method such as a corona charging method, proximity charging method, or injection charging method may also be employed. A surface of the charged photosensitive member 1 is irradiated with exposure light 4 from an exposure unit (not illustrated) to form an electrostatic latent image corresponding to target image information. Exposure light 4 is light that is intensity-modulated in correspondence with a time series electrical digital image signal of the target image information, and for example, it is output from an image exposure unit such as slit exposure or laser beam scanning exposure. The electrostatic latent image formed on the surface of photosensitive member 1 is developed (normal or reversed development) with toner contained in a development unit 5 to form a toner image on a surface of photosensitive member 1. The toner image formed on the surface of photosensitive member 1 is transferred to a transfer material 7 by a transfer unit 6. At this time, a bias voltage of opposite polarity to the charge held by the toner is applied to transfer unit 6 from a bias power supply (not illustrated). Moreover, in the case of transfer material 7 being paper, transfer material 7 is taken out from a paper feeding section (not illustrated) and fed between photosensitive member 1 and transfer unit 6, by being synchronized with rotation of photosensitive member 1. Transfer material 7 onto which the toner image has been transferred from photosensitive member 1 is separated from the surface of photosensitive member 1, transferred to a fixing unit 8, and undergoes fusing treatment therein to produce an image (print, copy), which is then printed out of the electrophotographic apparatus.

After having transferred the toner image onto transfer material 7, the surface of electrophotographic photosensitive member 1 is cleaned by removing adhesive materials such as toner (residue toner from the transfer) by a cleaning unit 9. With the recently developed cleaner-less system, a residue toner from transfer can also be directly removed by a developer or the like. Furthermore, the surface of electrophotographic photosensitive member 1 is used repeatedly for image formation after having been subjected to static elimination by a pre-exposure light 10 from a pre-exposure unit (not illustrated). In the case of charging unit 3 being a contact charging unit using a charging roller or the like, the pre-exposure unit is not necessarily required. In the present disclosure, a plurality of components of the aforementioned electrophotographic photosensitive member 1, charging unit 3, development unit 5, and cleaning unit 9 is housed in a container and supported integratedly to form a process cartridge. This process cartridge can be configured to be detachable from the main body of the electrophotographic apparatus. For example, at least one selected from the group consisting of charging unit 3, development unit 5, and cleaning unit 9 is integratedly supported with electrophotographic photosensitive member 1 to form a cartridge. The cartridge can be a process cartridge 11 detachable from the main body of the electrophotographic apparatus with a guide unit 12 such as a rail of the main body of the electrophotographic apparatus. Exposure light 4 can be reflected light or transmitted light from a document in a case in which the electrophotographic apparatus is a copying machine or printer, or it may be light emitted by scanning a laser beam, driving an LED array, or driving a liquid crystal shutter array, or the like, which is conducted by reading a document with a sensor, converting it into a signal, and then following this signal.

Measurement methods of each physical property of the photosensitive member and the toner according to the present disclosure will be described below.

<Calculation of Primary Particle Size of Electroconductive Particle>

First, the entire electrophotographic photosensitive member was immersed in methyl ethyl ketone (MEK) in a graduated cylinder and irradiated with ultrasonic waves, a resin layer was removed, and then a substrate of the electrophotographic photosensitive member was taken out. Next, an insoluble portion (a photosensitive layer and protective layer containing electroconductive particles) that did not dissolve in MEK was filtered out and dried in a vacuum dryer. Further, the obtained solid was then suspended in a mixture of tetrahydrofuran (THF)/methylal at a volume ratio of 1:1, an insoluble portion was filtered, and then a filtrate was collected and dried in a vacuum dryer. The electroconductive particles and the protective layer resin were obtained by this operation. The filtrate was further heated to 500° C. in an electric furnace so that only the electroconductive particles were left as a solid, and the electroconductive particles were collected. The same treatment was applied to a plurality of electrophotographic photosensitive members in order to secure a necessary amount of electroconductive particles for measurement.

A portion of the electroconductive particles collected was dispersed in isopropanol (IPA), and the dispersion was added dropwise onto a grid mesh with a support film (Cu 150J manufactured by JEOL Ltd.), and then the electroconductive particle was observed with a scanning transmission electron microscope (JEM2800 manufactured by JEOL Ltd.) in STEM mode. Observation was made at magnifications of 500,000× to 1,200,000× so as to facilitate calculation of a particle size of the electroconductive particle, and STEM images of 100 electroconductive particles were photographed. In this case, an acceleration voltage was 200 kV, a probe size was 1 nm, and an image size was 1024×1024 pixels.

Using the obtained STEM images, primary particle sizes were measured by using an image processing software "Image-Pro Plus manufactured by Media Cybernetics, Inc.". First, using a straight line tool (Straight Line) on a toolbar, a scale bar displayed at the bottom of the STEM image is selected. By selecting "Set Scale" from an Analyze menu in this state, a new window opens, and a pixel distance of the selected line is input in a Distance in Pixels column. A value (for example, 100) of the scale bar is input in a Known Distance column of the window, and then a scale bar unit (for example, nm) is input in a Unit of Measurement column, and "OK" is clicked to complete scale setting. Next, using the straight line tool, a straight line was drawn so as to have the maximum diameter of the electroconductive particle to calculate a particle size. The same operation was conducted for 100 electroconductive particles, and a number-average value of the obtained values (maximum diameters) was used as a primary particle size of the electroconductive particle.

<Calculation of Concentration Ratio of Niobium Atoms/Titanium Atoms>

One 5 mm square sample piece was cut from the photosensitive member and then cut to a thickness of 200 nm with an ultrasonic ultramicrotome (UC7 manufactured by Leica Microsystems GmbH) at a cutting speed of 0.6 mm/s to fabricate a thin sample. The thin sample was observed by using a scanning transmission electron microscope (JEM28 manufactured by JEOL Ltd.) connected to an EDS analyzer (energy dispersive X-ray analyzer) at magnifications of 500,000× to 1,200,000×.

Among the observed cross sections of the electroconductive particles, the cross sections of the electroconductive particles having a maximum diameter of approximately 0.9 times or more and 1.1 times or less the primary particle size calculated above were selected visually. Subsequently, spectra of constituent elements in the cross section of the selected electroconductive particle were then collected using the EDS analyzer to fabricate an EDS mapping image. The spectra were collected and analyzed by using a NSS (manufactured by Thermo Fischer Scientific, Inc.). The probe size of 1.0 nm or 1.5 nm was appropriately selected so that an acceleration voltage was 200 kV and dead time was 15 or more and 30 or less as the collecting conditions, and a mapping resolution was 256×256 and the number of frames was 300. EDS mapping images were acquired for 100 cross sections of the electroconductive particles.

By analyzing the EDS mapping images obtained in this manner, a ratio of a niobium atom concentration (atomic %)/a titanium atom concentration (atomic %) at the center of the particle and at 5% inside of the maximum diameter of the particle measured from the surface of the particle, is calculated. Specifically, the "Line Extraction" button on NSS is first pressed, a line is drawn so that it has the maximum diameter of a particle, and then information on an atomic concentration (atomic %) on the straight line drawn from one surface to the other, passing through the interior of the particle to the other surface, is obtained. The maximum diameter of the particle obtained that was less than 0.9 times or greater than 1.1 times of the primary particle size calculated above was excluded from further analysis. Namely, only particles with the maximum diameter in the range of 0.9 or more and 1.1 times or less of the primary particle size were subjected to the analysis described below. Next, niobium atom concentrations (atomic %) on both particle surfaces at 5% inside of the maximum diameter of the particle measured from the surface of the particle, are read, and an arithmetic mean value of the two values obtained is calculated to obtain a "niobium atom concentration (atomic %) at 5% inside of the maximum diameter of the particle measured from the surface of the particle". In the same way, a "titanium atom concentration (atomic %) at 5% inside of the maximum diameter of the particle measured from the surface of the particle" is obtained. These values are then used to obtain "concentration ratios of niobium atoms and titanium atoms on both particle surfaces at 5% inside of the maximum diameter of the particle measured from the surface of the particle" respectively, according to the following equation:

(Concentration ratio of niobium atoms and titanium atoms at 5% inside of the maximum diameter of the particle measured from the surface of the particle)=(Niobium atom concentration (atomic %) at 5% inside of the maximum diameter of the particle measured from the surface of the particle)/(titanium atom concentration (atomic %) at 5% inside of the maximum diameter of the particle measured from the surface of the particle)

The smaller value of the two concentration ratios obtained is adopted as the "concentration ratio of niobium atoms and titanium atoms at 5% inside of the maximum diameter of the particle measured from the surface of the particle" in the present disclosure. It is noted that for ordinary particles, there is no significant difference between the two concentration ratios.

Moreover, a niobium atom concentration (atomic %) and titanium atom concentration (atomic %) at the midpoint of the maximum diameter, which is the position on the above straight line, are read. Using these values, a "concentration ratio of niobium atoms and titanium atoms at the center of the particle" is obtained according to the following equation:

Concentration ratio of niobium atoms and titanium atoms at the center of the particle=(niobium atom concentration (atomic %) at the center of the particle)/(titanium atom concentration (atomic %) at the center of the particle)

A "concentration ratio determined as a niobium atom concentration/a titanium atom concentration at 5% inside of the maximum diameter of the particle measured from the surface of the particle, relative to a concentration ratio determined as a niobium atom concentration/a titanium atom concentration at the center of the particle" is calculated by the following equation:

(Concentration ratio determined as a niobium atom concentration/a titanium atom concentration at 5% inside of the maximum diameter of the particle measured from the surface of the particle, relative to a concentration ratio determined as a niobium atom concentration/a titanium atom concentration at the center of the particle)=(Concentration ratio of niobium atoms and titanium atoms at 5% inside of the maximum diameter of the particle measured from the surface of the particle)/(concentration ratio of niobium atoms and titanium atoms at the center of the particle).

<Calculation of Content of Electroconductive Particle>

Next, four 5 mm square sample pieces were cut from the photosensitive member, and the protective layer was then three-dimensionalized to 2 μm×2 μm×2 μm by a FIB-SEM Slice & View. From the contrast difference in Slice & View, the content of the electroconductive particles occupied in the entire volume of the protective layer was calculated. The Slice & View conditions were as follows:

Sample processing for analysis: FIB method
Processing and observation apparatus: NVision 40 manufactured by SII NanoTechnology/Carl Zeiss NTS
Slice interval: 10 nm
Observation Conditions:
Accelerating voltage: 1.0 kV
Sample inclination: 54°
WD: 5 mm
Detector: BSE detector
Aperture: 60 μm, high current
ABC: ON
Image resolution: 1.25 nm/pixel Analysis is conducted in an area of 2 μm (vertical)×2 μm (horizontal), and the information for each cross section is integrated to obtain a volume V per 8 $\mu m^3$ (2 μm length×2 μm width×2μ thickness). Moreover, the measurement environment is as follows: temperature: 23° C. and pressure: $1\times10^{-4}$ Pa. A processing and observation apparatus that is an FEI Strata 400S (sample inclination: 52°) manufactured by FEI Company can also be used. In addition, information for each cross section was obtained by image analysis of the area of the specified electroconductive particle of the present disclosure. Image analysis was conducted by an image processing software: Image-Pro Plus, manufactured by Media Cybernetics, Inc.

Based on the information obtained, a volume V of the electroconductive particles of the present disclosure in a volume of 2 μm×2 μm×2 μm (unit volume: 8 $\mu m^3$), in each of the four sample pieces, was determined to calculate the content of electroconductive particles [% by volume] (=V $\mu m^3$/8 $\mu m^3$×100). An average value of the contents of the electroconductive particles in each of the four sample pieces was determined as the content [% by volume] of the electroconductive particles of the present disclosure in the protective layer relative to the total volume of the protective layer.

In this case, a film thickness t (cm) of the protective layer was measured by processing it to the boundary between the protective layer and an underlayer for all four sample pieces, and the film thickness value of the protective layer was used to calculate volume resistivity ρs in the following <Measurement method of volume resistivity of protective layer of photosensitive member>.

<Quantification of Niobium Atoms Contained in Electroconductive Particle>

Niobium atoms contained in the electroconductive particle are quantified as follows.

The electroconductive particles collected from the photosensitive member in <Calculation of primary particle size of electroconductive particle> above are pelletized by the following press molding method to fabricate samples. Using the fabricated sample, measurement using an X-ray fluorescence spectrometer (XRF) is carried out, and the niobium atom content of the entire electroconductive particle is quantified by an FP method.

Specifically, niobium 5 oxide is quantified and the quantified value obtained is converted to a niobium atom content.

(i) Example of Apparatus Used
X-ray fluorescence analyzer 3080 (manufactured by Rigaku Corporation)
(ii) Sample Preparation A sample is prepared by using a sample press molding machine manufactured by MAEKAWA Testing Machine MFG Co., LTD. An aluminum ring (Model No. 3481E1) is charged with 0.5 g of electroconductive particles, pressed for 1 min after having set a load of 5.0 tons, and the particles are pelletized.

(iii) Measurement Conditions
Measurement diameter: 10ϕ
Measurement potential, voltage: 50 kV, 50 to 70 mA
2θ angle: 25.12°
Crystal plate: LiF
Measurement time: 60 sec <Powder X-Ray Diffraction Measurement of Electroconductive Particle>

A method for determining whether anatase type titanium oxide or rutile type titanium oxide is contained in the electroconductive particle used for the electrophotographic photosensitive member of the present disclosure will be shown below.

Identification is made by using the inorganic materials database (AtomWork) of the National Institute for Materials Science (NIMS) based on a chart obtained from powder X-ray diffraction using CuKα X-rays. Treatment of the electroconductive particles contained in the protective layer of the electrophotographic photosensitive member of the present disclosure is followed by that in the aforementioned <Quantification of niobium atoms contained in electroconductive particle> as an example.

Measurement apparatus used: X-ray diffractometer RINT-TTRII manufactured by Rigaku Corporation
X-ray tube: Cu
Tube voltage: 50 KV
Tube current: 300 mA
Scanning method: 2θ/θ scan
Scanning speed: 4.0°/min
Sampling interval: 0.02°
Start angle (2θ): 5.0°
Stop angle (2θ): 40.0°
Attachment: Standard sample holder
Filter: Not used
Incident monochromator: Used
Counter monochromator: Not used Divergence slit: Open Divergence vertical limit slit: 10.00 mm Scattering slit: Open Receiving slit: Open Flat-plate monochromator: Used Counter: Scintillation counter <Measurement Method of Volume Resistivity of Protective Layer>

A pA (picoampere) meter was used to measure volume resistivity of the present disclosure.

Figure 2:
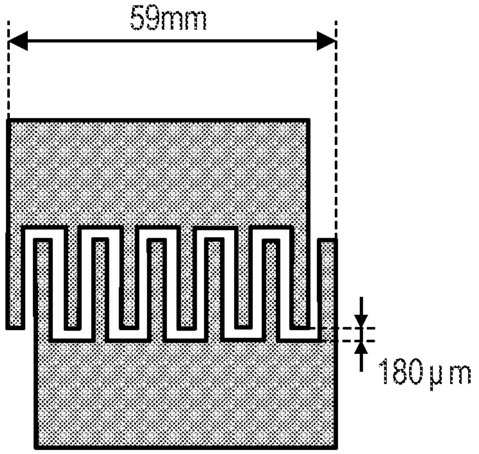
FIG. 2 is a view illustrating an example of a comb-type electrode for measuring a volume resistivity of the photosensitive member according to the present disclosure.

First, each comb-type electrode with a distance between electrodes (D) of 180 μm and a length (L) of 59 mm, illustrated in FIG. 2 was fabricated on a PET film by vapor deposition, and a protective layer with a thickness (T1) of 2 μm was arranged thereon. Next, a direct current voltage (I) when applying a direct current voltage (V) of 100 V between the comb-type electrodes, was measured under environments of a temperature of 23° C./humidity of 50% RH and a temperature of 32.5° C./humidity of 80% RH, respectively, and volume resistivity ρv (Ω·cm) was obtained by the following formula (1).

$$\text{Volume resistivity } \rho v\ (\Omega\cdot\text{cm}) = V\ (\text{V}) \times T1\ (\text{cm}) \times L\ (\text{cm}) / \{I\ (\text{A}) \times D\ (\text{cm})\} \quad (1)$$

In the case of being difficult to identify compositions of the electroconductive particle, binder resin or the like in the protective layer, surface resistivity is measured on the surface of the electrophotographic photosensitive member to convert it to volume resistivity. In a case in which volume resistivity of the protective layer as coated on the surface of the photosensitive member is measured, rather than the protective layer itself, surface resistivity of the protective layer is desirably measured and then converted to the volume resistivity therefrom.

In the present disclosure, a comb-type electrode with a distance between electrodes (D) of 180 μm and a length (L) of 59 mm, illustrated in FIG. 2 is fabricated on the surface of the electrophotographic photosensitive member by gold vapor deposition. Next, a direct current voltage (I) when applying a direct current voltage (V) of 1,000 V between the comb-type electrodes, is measured under an environment of a temperature of 23° C./humidity of 50% RH, and surface resistivity $\rho_s$ of the protective layer was determined from the direct current voltage (V)/the direct current voltage (I).

Furthermore, volume resistivity $\rho_v$ (Ω·cm) was calculated by the following formula (2) using the thickness t (cm) of the protective layer measured in the aforementioned <Calculation of content of electroconductive particle>

$$\rho_v = \rho_s \times t \quad (2)$$

($\rho_v$: volume resistivity, $\rho_s$: surface resistivity, t: thickness of the protective layer)

Since this measurement involves measuring a minute amount of current, an apparatus capable of measuring minute current is preferred as a resistance measurement apparatus. Examples thereof include a Picoammeter 4140B manufactured by Hewlett-Packard Company. A comb-type electrode to be used and voltage to be applied are desirably selected so that an appropriate signal-to-noise ratio can be obtained depending on a material and resistance of the charge injection layer.

<Measurement of Content of Multivalent Metal Element in Toner Particle (ICP-AES)>

(1) Method for Obtaining a Toner Particle by Cleaning an External Additive Particle from the Toner When the toner contains an external additive such as a silica microparticle, the following step is employed to remove the external additive from the surface of the toner particle.

5 g of toner is weighed into a 200 ml poly cup with a lid by using a precision balance, 100 ml of methanol is added, and the mixture is dispersed with an ultrasonic disperser for 5 minutes. After confirming that the toner sufficiently precipitated by centrifugation, supernatant liquid is discarded. A step of dispersing a mixture with methanol and discarding supernatant liquid is repeated three times, and then 100 ml of 10% NaOH and a few drops of "Contaminon N" (a 10% by mass aqueous solution of a neutral detergent for cleaning precision measuring instruments with pH 7, composed of a nonionic surfactant, an anionic surfactant, and an organic builder, manufactured by Wako Pure Chemical Industries, Ltd.), are added, mildly mixed, and then the mixture is allowed to stand undisturbed for 24 hours. Thereafter, the mixture is separated using a centrifuge. At this time, the toner particles are rinsed with distilled water repeatedly so that NaOH does not remain. The collected toner particles are thoroughly dried in a vacuum dryer to obtain toner particles. The above operation dissolves and removes the external additive of silica microparticle.

(2) Measurement of Content of Multivalent Metal Element in Toner Particle

The content of multivalent metal element in the toner particle is quantified by a coupled induction plasma atomic emission spectrometer (ICP-AES manufactured by Seiko Instruments Inc.)

As pretreatment, to 100.0 mg of toner particles are mixed with 8.00 ml of 60% nitric acid (for atomic absorption analysis, manufactured by Kanto Chemical Co., Inc.) to acid decompose them.

Upon acid decomposition, the toner particles are treated in an airtight container at an internal temperature of 220° C. for 1 hour by using a microwave high-power sample pretreatment apparatus ETHOS 1600 (Milestone General K. K.) to prepare a solution sample containing multivalent metal elements.

Thereafter, ultrapure water is added so as to make a total volume of the sample 50.00 g, which is then used as a measurement sample. A calibration curve is prepared for each multivalent metal element, and the amount of metal contained in each sample is quantitatively determined. It is noted that a solution is prepared such that ultrapure water is added to 8.00 ml of nitric acid to make a total amount 50.00 g and is measured as a blank sample. The amount of metal in the blank sample has been subtracted.

<Identification of Wax in Toner>

(1) Method for Separating Wax from Toner

The wax in the toner can be measured without removing the toner, however, it preferably undergoes separation operation of the toner.

First, the melting point of the wax in the toner is determined by using a thermal analyzer (DSC Q2000 manufactured by TA Instruments Japan Inc.). Approximately 3.0 mg of the toner sample is placed in a sample container of an aluminum pan (KIT NO. 0219-0041) and the sample container is placed on a holder unit, and set in an electric furnace. Under a nitrogen atmosphere, the sample is heated from 30° C. to 200° C. at a rate of temperature rise of 10° C./minute, and a DSC curve is measured by differential scanning calorimetry (DSC) to determine the melting point of the wax in the toner sample.

Next, the toner is dispersed in ethanol that is a poor solvent for toner, and raised to a temperature exceeding the melting point of wax. In this case, pressure may be applied if necessary. The wax underwent the temperature increase exceeding the melting point is melted and extracted into the ethanol by this operation. In the case of heating and further applying pressure to the wax, the wax can be separated from the toner by solid-liquid separation with the pressure being maintained. Subsequently, the extract is then dried and solidified to obtain wax.

(2) Identification of Wax by Pyrolysis GCMS

Specific conditions for wax identification by pyrolysis GCMS are shown below.

Mass spectrometer: ISQ manufactured by Thermo Fischer Scientific, Inc.
GC system: Focus GC manufactured by Thermo Fischer Scientific, Inc.
Ion source temperature: 250° C.
Ionization method: EI
Mass range: 50 to 1000 m/z
Column: HP-5MS [30 m]
Pyrolyzer: JPS-700 manufactured by Japan Analytical Industry Co., Ltd.

In a pyro-foil at 590° C. are added a small amount of wax separated by the extraction operation and 1 μL of tetramethylammonium hydroxide (TMAH) is added. Pyrolysis GCMS measurement of the fabricated sample was carried out under the above conditions to obtain peaks derived from the wax. In the case of the wax being an ester compound, each peak for the alcohol component and for the carboxylic acid component is obtained. The alcohol component and the carboxylic acid component are detected as methylated compounds thereof by action of TMAH that is a methylating agent. Analysis on the obtained peaks and identification of the structure of the ester compound enable a molecular weight to be obtained as well.

<Measurement Method of Weight-Average Particle Size (D4) of Toner>

The weight-average particle size (D4) of the toner is calculated as follows. A measurement apparatus that is a precision particle size distribution measuring apparatus equipped with a 100 μm aperture tube by a pore electric resistance method, "Coulter Counter Multisizer 3®", manufactured by Beckman Coulter, Inc., is used.

For setting of measurement conditions and analysis of measurement data, a dedicated software attached "Beckman Coulter Multisizer 3 Version 3.51" manufactured by Beckman Coulter, Inc., is used. It is noted that the measurement is carried out with 25,000 effective measurement channels.

An electrolytic solution used in the measurement is used such that special grade sodium chloride is dissolved in ion-exchanged water to make a solution concentration 1.0%, for example, "ISOTON II" (manufactured by Beckman Coulter, Inc.).

Before carrying out measurement and analysis, the dedicated software will be set up in the following manner.

In the "Change Standard Measurement Method (SOMME)" screen of the dedicated software, a total count in the control mode is set to 50,000 particles, the number of measurements is set to 1, and a Kd value is set to a value obtained by using "Standard particle 10.0 μm" (manufactured by Beckman Coulter, Inc.). A threshold value and a noise level are automatically set by pressing the "Measure Threshold/Noise Level" button. Moreover, current is set to 1,600 μA, a gain is set to 2, and an electrolyte is set to ISOTON II, and a check mark is put in the "Flush Aperture Tube After Measurement".

In the "From Pulse to Particle Size Conversion Setting" screen of the dedicated software, a bin interval is set to a logarithmic particle size, a particle size bin is set to a 256 particle size bin, and a particle size range is set from 2 μm to 60 μm.

The specific measurement method is as follows.

(1) A 250-mL round bottom glass beaker dedicated for Multisizer 3 is filled with 200.0 mL of electrolytic aqueous solution, set to a sample stand, and a stirrer rod is stirred counterclockwise at 24 revolution/second. Then, dirt and air bubbles in the aperture tube are removed by employing the function "Flush Aperture Tube" of the dedicated software.

(2) 30.0 mL of an electrolytic aqueous solution is fed into a 100-mL flat bottom beaker made of glass. In this solution, it is added 0.3 ml of a dilute solution in which a "Contaminon N" (a 10% by mass aqueous solution of a neutral detergent for cleaning precision measuring instruments with pH 7, composed of a nonionic surfactant, an anionic surfactant, and an organic builder, manufactured by Wako Pure Chemical Industries, Ltd.), is diluted three times with ion-exchanged water.

(3) An ultrasonic disperser "Ultrasonic Dispersion System Tetra 150" (manufactured by Nikkaki Bios Co., Ltd.) with an electrical output of 120 W, incorporating two oscillators with a frequency of 50 kHz with a phase shifted by 180 degrees, is prepared. A water bath of the ultrasonic disperser is charged with 3.3 L of ion-exchanged water and added with 2.0 mL of Contaminon N.

(4) The beaker of (2) above is set in a beaker fixing hole of the ultrasonic disperser above and the ultrasonic disperser is operated. Then, a height position of the beaker is adjusted so that a resonance state of the liquid surface of the electrolytic aqueous solution in the beaker is maximized.

(5) With the electrolytic aqueous solution in the beaker described in (4) above being irradiated with ultrasonic waves, 10 mg of the toner and the like are added little by little to the above electrolytic aqueous solution, and the mixture is dispersed. Then, ultrasonic dispersion treatment is continued for another 60 seconds. Upon the ultrasonic dispersion, a water temperature in the tank is appropriately adjusted so as to be 10° C. or higher and 40° C. or lower.

(6) The electrolytic solution of (5) above, in which the toner and the like were dispersed is added dropwise by using a pipette into the round bottom beaker of (1) above disposed in the sample stand to adjust a measurement concentration to 5%. Then, measurement is carried out until the number of particles reaches 50,000.

(7) The measurement data is analyzed by using the dedicated software attached to the apparatus, and the weight-average particle size (D4) is calculated. An "average size" on the "Analysis/Volume Statistics (Arithmetic Average)" screen when setting it to graph/% by volume using the dedicated software, is the weight-average particle size (D4).

EXAMPLES

The photosensitive member and the toner of the present disclosure will be described in detail by using Examples and Comparative Examples below. It is noted that in the following Examples, "part" refers to a part based on mass unless otherwise specified.

Production examples of the photosensitive member will be described below.

Production Examples 1 to 3 of Titanium Oxide Particle

The titanium oxide particle of the present disclosure preferably has an anatase degree of 90 to 100%, and a titanium oxide particle with anatase degree of approximately 100% can be produced by the following method.

Here, the degree of anatase is a value determined by measuring a ratio of intensity of the strongest interference line of anatase (plane index 101) IA, and intensity of the strongest interference line of rutile (plane index 101) IR, in powder X-ray diffraction of titanium oxide particle and then substituting these values obtained in the following formula.

$$\text{Anatase degree (\%)}=100/(1+1.265\times IR/IA)$$

In the present disclosure, a solution containing titanyl sulfate was heated and hydrolyzed to prepare a hydrous titanium dioxide slurry, and it was then dehydrated and calcined to obtain an anatase-type titanium oxide particle. By controlling the concentration of titanyl sulfate solution, the number-average particle size of the anatase type titanium oxide particle was controlled to obtain a titanium oxide particle 1 with the number-average particle size of 150 nm, a titanium oxide particle 2 with the number-average particle size of 160 nm, and a titanium oxide particle 3 with the number-average particle size of 130 nm.

Production Example of Niobium Atoms-Containing Titanium Oxide Particle 1

100 g of titanium oxide particles 1 was dispersed in water to form a 1 L water suspension, which was heated to a temperature of 60° C. To this solution, a titanium niobate solution (the mass ratio of niobium and titanium in the solution is 1.0/33.7) mixed with a niobium solution in which 3 g of niobium pentachloride ($NbCl_5$) was dissolved in 100 mL of 11.4 mol/L hydrochloric acid and 600 mL of a titanium sulfate solution containing 33.7 g as titanium, and a 10.7 mol/L sodium hydroxide aqueous solution, were simultaneously added (in parallel) dropwise over 3 hours so that a pH of the suspension was 2 to 3. After completion of dropping, the suspension was filtered, washed, and dried at 110° C. for 8 hours. The dried product was heat-treated (calcination treatment) at 800° C. for 1 hour in an atmospheric atmosphere to obtain a niobium atoms-containing titanium oxide particle 1 with niobium atoms unevenly distributed in the vicinity of the surface. Table 1 shows the physical properties of niobium atoms-containing titanium oxide particle 1.

Production Example of Niobium Atoms-Containing Titanium Oxide Particle 2

A niobium atoms-containing titanium oxide particle 2 was obtained in the same manner as in the production of niobium atoms-containing titanium oxide particle 1 except that titanium oxide particle 1 was changed to titanium oxide particle 2 and the conditions upon coating were changed as appropriate. Table 1 shows the physical properties of niobium atoms-containing titanium oxide particle 2.

Production Example of Niobium Atoms-Containing Titanium Oxide Particle 3

To a hydrous titanium dioxide slurry obtained by hydrolyzing a titanyl sulfate aqueous solution was added niobium sulfate (water-soluble niobium compound). The niobium sulfate was added at a proportion of 0.2% by mass as a niobium ion relative to the amount of titanium in the slurry (in terms of titanium dioxide).

After hydrolysis and dehydration of the above, the slurry was calcined at a calcination temperature of 1,000° C. As a result, an anatase-type titanium oxide particle containing 0.20% by mass niobium atoms with the number-average particle size of 150 nm (niobium atoms-containing titanium oxide particle before coating), was obtained.

A niobium atoms-containing titanium oxide particle 3 was obtained in the same manner as in the production of niobium atoms-containing titanium oxide particle 1 except that titanium oxide particle 1 was changed to the above niobium atoms-containing titanium oxide particle and the conditions upon coating were changed as appropriate. Niobium-containing titanium oxide particle 3 obtained was a particle in which niobium atoms are present inside the particle as well. Table 1 shows the physical properties of niobium atoms-containing titanium oxide particle 3.

Production Examples of Niobium Atoms-Containing Titanium Oxide Particles 4 to 9

Each of niobium atoms-containing titanium oxide particles 4 to 9 was obtained in the same manner as in the production of niobium atoms-containing titanium oxide particle 3 except that the number-average particle size of the niobium atoms-containing titanium oxide particle before coating was changed by changing the aqueous titanyl sulfate aqueous solution, and the conditions upon coating were appropriately changed. Table 1 shows the physical properties of niobium atoms-containing titanium oxide particles 4 to 9.

Production Example of Niobium Atoms-Containing Titanium Oxide Particle 10

A niobium atoms-containing titanium oxide particle 10 was obtained in the same manner as in the production of niobium atoms-containing titanium oxide particle 3 except that the amount of niobium ions was changed, and the niobium solution in which 3 g of niobium pentachloride ($NbCl_5$) was dissolved in 100 mL of 11.4 mol/L hydrochloric acid, was not used. Table 1 shows the physical properties of niobium atoms-containing titanium oxide particle 10.

Niobium Atoms-Containing Titanium Oxide Particle 11

A niobium atoms-containing titanium oxide particle 11 was obtained in the same manner as in the production of niobium atoms-containing titanium oxide particle 3 except that the concentration of titanyl sulfate aqueous solution and the amount of niobium ions were changed and no coating was applied. Table 1 shows the physical properties of niobium atoms-containing titanium oxide particles 11.

TABLE 1

| | Number-average particle size (nm) | Particle before coating<br>Type | Particle before coating<br>Number-average particle size (nm) | Coating material<br>Type |
|---|---|---|---|---|
| Niobium atoms-containing titanium oxide particle 1 | 170 | Titanium oxide particle 1 | 150 | Niobium atoms-containing titanium oxide |
| Niobium atoms-containing titanium oxide particle 2 | 180 | Titanium oxide particle 2 | 160 | Niobium atoms-containing titanium oxide |
| Niobium atoms-containing titanium oxide particle 3 | 170 | Niobium atoms-containing titanium oxide particle before coating | 150 | Niobium atoms-containing titanium oxide |
| Niobium atoms-containing titanium oxide particle 4 | 300 | Niobium atoms-containing titanium oxide particle before coating | 280 | Niobium atoms-containing titanium oxide |
| Niobium atoms-containing titanium oxide particle 5 | 210 | Niobium atoms-containing titanium oxide particle before coating | 190 | Niobium atoms-containing titanium oxide |
| Niobium atoms-containing titanium oxide particle 6 | 170 | Niobium atoms-containing titanium oxide particle before coating | 150 | Niobium atoms-containing titanium oxide |
| Niobium atoms-containing titanium oxide particle 7 | 180 | Niobium atoms-containing titanium oxide particle before coating | 160 | Niobium atoms-containing titanium oxide |
| Niobium atoms-containing titanium oxide particle 8 | 170 | Niobium atoms-containing titanium oxide particle before coating | 150 | Niobium atoms-containing titanium oxide |
| Niobium atoms-containing titanium oxide particle 9 | 190 | Niobium atoms-containing titanium oxide particle before coating | 170 | Niobium atoms-containing titanium oxide |
| Niobium atoms-containing titanium oxide particle 10 | 170 | Niobium atoms-containing titanium oxide particle before coating | 150 | Titanium oxide |
| Niobium atoms-containing titanium oxide particle 11 | 6 | Niobium atoms-containing titanium oxide particle before coating | 6 | Without coating |

Production Example of Electroconductive Particle 1

The following materials were prepared.

100.0 parts of niobium atoms-containing titanium oxide particle 1 (specific gravity: 4

3.0 parts of the compound shown in formula (S-1) below as a silane coupling agent (product name: KBM-3033, manufactured by Shin-Etsu Chemical Co., Ltd.)

(S-1)

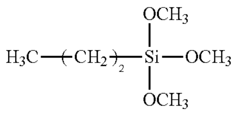

They were mixed with 200.0 parts of toluene, and the mixture was stirred with a stirrer for 4 hours, filtered, washed, and then further heat-treated at 130° C. for 3 hours. Surface treatment was carried out in such a manner to obtain electroconductive particle 1. The physical properties of electroconductive particle 1 are shown in Table 2. It is noted that the niobium atom content in Table 2 is the content of niobium atoms in the electroconductive particle and is a value determined by elemental analysis using X-ray fluorescence (XRF).

TABLE 2

| | Particle | Surface treatment agent | A/B | Niobium atom content (% by mass) |
|---|---|---|---|---|
| Electroconductive particle 1 | Niobium atoms-containing titanium oxide particle 1 | Formula (S-1) | 7.9 | 5.0 |
| Electroconductive particle 2 | Niobium atoms-containing titanium oxide particle 2 | Formula (S-1) | 7.9 | 5.0 |
| Electroconductive particle 3 | Niobium atoms-containing titanium oxide particle 3 | Formula (S-1) | 15.8 | 10.0 |

TABLE 2-continued

| | Particle | Surface treatment agent | A/B | Niobium atom content (% by mass) |
|---|---|---|---|---|
| Electroconductive particle 4 | Niobium atoms-containing titanium oxide particle 10 | Formula (S-1) | 0 | 5.0 |
| Electroconductive particle 5 | Niobium atoms-containing titanium oxide particle 11 | Formula (S-1) | 1 | 0.5 |
| Electroconductive particle 6 | Titanium oxide particle 3 | Formula (S-1) | — | — |
| Electroconductive particle 7 | Tin oxide particle | Formula (S-2) | — | — |
| Electroconductive particle 8 | Niobium atoms-containing titanium oxide particle 4 | Formula (S-1) | 0.04 | 8.0 |
| Electroconductive particle 9 | Niobium atoms-containing titanium oxide particle 5 | Formula (S-1) | 4.1 | 2.6 |
| Electroconductive particle 10 | Niobium atoms-containing titanium oxide particle 6 | Formula (S-1) | 7.9 | 5.0 |
| Electroconductive particle 11 | Niobium atoms-containing titanium oxide particle 7 | Formula (S-1) | 7.9 | 5.0 |
| Electroconductive particle 12 | Niobium atoms-containing titanium oxide particle 8 | Formula (S-1) | 0.8 | 0.5 |
| Electroconductive particle 13 | Niobium atoms-containing titanium oxide particle 9 | Formula (S-1) | 23.7 | 15 |

In the table, A is "a concentration ratio of niobium atoms and titanium atoms at 5% inside of the maximum diameter of the particle measured from the surface of the particle", and B is "a concentration ratio of niobium atoms and titanium atom at the center of the particle".

Production Examples of Electroconductive Particles 2 to 6 and 8 to 13

Each of electroconductive particles 2 to 6 and 8 to 13 was obtained in the same manner as in the production of electroconductive particle 1 except that a niobium atoms-containing titanium oxide particle to be used was changed as shown in Table 2 and the conditions upon surface treatment were changed as appropriate. The physical properties of electroconductive particles 2 to 6 and 8 to 13 are shown in Table 2.

Production Example of Electroconductive Particle 7

The following materials were prepared.

100.0 parts of tin oxide particles (product name: S-2000, manufactured by Mitsubishi Materials Corporation, number-average particle size of 100 nm)

20.0 parts of the compound shown in formula (S-2)

(S-2)

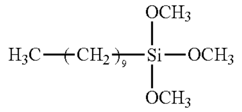

They were mixed with 200.0 parts of toluene, and the mixture was stirred with a stirrer for 4 hours, filtered, washed, and then further heat-treated at 130° C. for 3 hours. Electroconductive particle 7 was obtained in such a manner. The physical properties of electroconductive particle 7 are shown in Table 2.

Production Example of Electrophotographic Photosensitive Member 1

An aluminum cylinder with 24 mm in diameter and 257.5 mm in length (JIS-A3003, aluminum alloy) was used as a support (electroconductive support).

Production Example of Electroconductive Layer

Next, the following materials were prepared.

214.0 parts of titanium oxide ($TiO_2$) particles coated with oxygen-deficient tin oxide ($SnO_2$) as a metal oxide particle (number-average particle size of 230 nm)

132.0 parts of a phenolic resin (monomer/oligomer of a phenolic resin) as a binding material (product name: PRIOPHEN J-325, manufactured by DIC Corporation; resin solid content: 60% by mass)

98.0 parts of 1-methoxy-2-propanol as a solvent

They were placed in a sand mill with 450.0 parts of glass beads of 0.8 mm in diameter and subjected to dispersion treatment under the conditions of the number of revolution: 2,000 rpm, dispersion treatment time: 4.5 hours, and set temperature of cooling water: 18° C., to obtain a dispersion. The glass beads were removed from the dispersion with a mesh (aperture: 150 μm).

To the dispersion obtained were added silicone resin particles (product name: TOSPEARL 120, manufactured by Momentive Performance Materials Inc., average particle size of 2 μm) as a surface roughness-imparting agent. The amount of silicone resin particles added was 10% by mass relative to the total mass of the metal oxide particles and the binding material in the dispersion after the glass beads were removed. In addition, silicone oil (product name: SH28PA, manufactured by Dow Toray Co., Ltd.) as a leveling agent was added to the dispersion so as to be 0.01% by mass relative to the total mass of the metal oxide particles and the binding material in the dispersion.

Next, to the dispersion was added a mixed solvent of methanol and 1-methoxy-2-propanol (mass ratio 1:1) so that the total mass of the metal oxide particles, binding material, and the surface roughness-imparting agent in the dispersion (i.e., mass of solids) was 67% by mass relative to the mass of the dispersion. Thereafter, the mixture was stirred and a coating solution for the electroconductive layer was prepared.

A support was coated thereon with this coating solution for the electroconductive layer by dipping the support in the coating solution, and the coated support was heated at 140° C. for 1 hour to form an electroconductive layer with a thickness of 30 μm.

Production Example of Undercoat Layer

Next, the following materials were prepared.

3.1 parts of the electron transport substance denoted by the following formula (E-1)

6.5 parts of a blocked isocyanate (product name: DURANATE SBB-70P, manufactured by Asahi Kasei Chemicals Corporation)

0.40 parts of a styrene-acrylic resin (product name: UC-3920, manufactured by Toagosei Co., Ltd.)

1.8 parts of a silica slurry (product name: IPA-ST-UP, manufactured by Nissan Chemical Corporation, solid concentration: 15% by mass, viscosity: 9 mPa·s)

They were dissolved in a mixed solvent of 48.0 parts of 1-butanol and 24.0 parts of acetone to prepare a coating solution for the undercoat layer.

The electroconductive layer was coated thereon with this coating solution for the undercoat layer by dipping the electroconductive layer in the coating solution, and the coated layer was heated at 170° C. for 30 minutes to form an undercoat layer with a thickness of 0.7 μm.

(E-1)

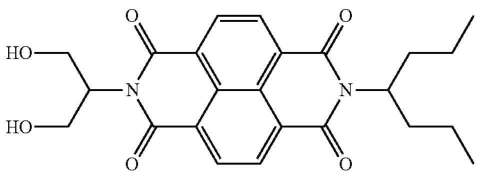

Production Example of Photosensitive Layer

Next, 10.0 parts of hydroxygallium phthalocyanine in crystal form, having peaks at 7.5° and 28.4° in a chart obtained from CuKα characteristic X-ray diffraction, and 5 parts of a polyvinyl butyral resin (product name: S-LEC BX-1, manufactured by SEKISUI CHEMICAL CO., LTD.) were prepared.

They were added to 200.0 parts of cyclohexanone, and the mixture was dispersed in a sand mill apparatus with glass beads with a diameter of 0.9 mm for 6 hours. This mixture was further added and diluted with 150.0 parts of cyclohexanone and 350.0 parts of ethyl acetate to obtain a diluted coating solution for the charge generation layer.

The undercoat layer was coated thereon with the obtained coating solution by dipping the undercoat layer in the solution, and the coated layer was dried at 95° C. for 10 minutes to form a charge generation layer with a thickness of 0.20 μm.

X-ray diffraction measurement was carried out under the following conditions.

[Powder X-Ray Diffraction Measurement]

Measurement apparatus used: X-ray diffractometer RINT-TTRII, manufactured by Rigaku Corporation
X-ray tube: Cu
Tube voltage: 50 KV
Tube current: 300 mA
Scanning method: 2θ/θ scan
Scanning speed: 4.0°/min
Sampling interval: 0.02°
Start angle (2θ): 5.0°
Stop angle (2θ): 40.0°
Attachment: Standard sample holder
Filter: Not used
Incident monochromator: Used
Counter monochromator: Not used
Divergence slit: Open
Divergence vertical limit slit: 10.00 mm
Scattering slit: Open
Receiving slit: Open
Flat plate monochromator: Used
Counter: Scintillation counter Next, the following materials were prepared.

6.0 parts of a charge transport substance (hole transport substance) represented by the Following formula (C-1)

3.0 parts of a charge transport substance (hole transport substance) represented by the following formula (C-2)

1.0 part of a charge transport substance (hole transport substance) represented by the following formula (C-3)

10.0 parts of a polycarbonate (product name: Iupilon Z400, manufactured by Mitsubishi Engineering-Plastics Corporation)

0.02 parts of a polycarbonate resin having copolymerization units of the following formula (C-4) and formula (C-5) (x/y=0.95/0.05: viscosity-average molecular weight=20,000)

A coating solution for a charge transport layer was prepared by dissolving them in a mixed solvent of 25.0 parts of ortho-xylene, 25.0 parts of methyl benzoate and 25.0 parts of dimethoxymethane. The charge generation layer was coated thereon with the obtained coating solution for the charge transport layer by dipping the charge generation layer in the solution, and drying the coated layer at 120° C. for 30 minutes to form a charge transport layer with a thickness of 12 μm.

(C-1)

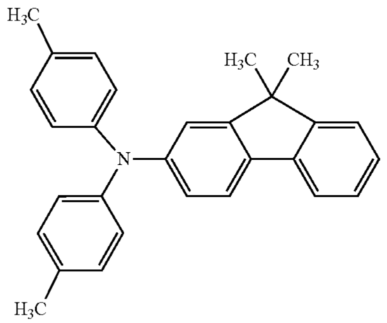

-continued (C-2)

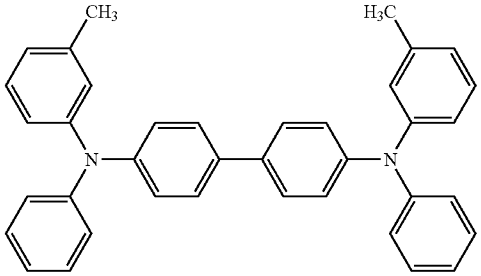

(C-3)

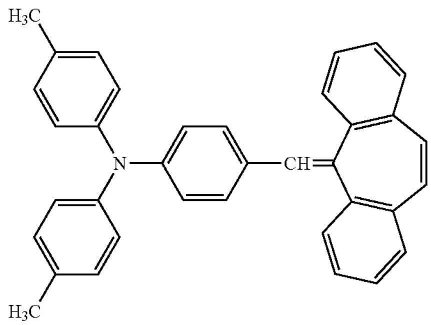

(C-4)

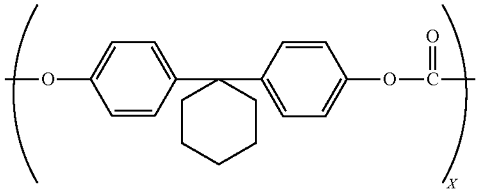

(C-5)

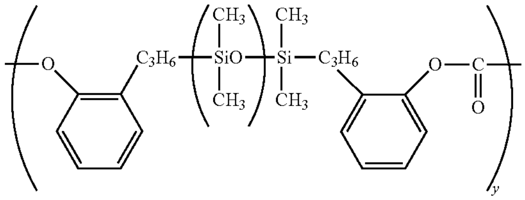

Production Example of Surface Protective Layer

Next, the following materials were prepared.

1.0 part of the compound represented by the following structural formula (O-1) as a binder resin (O-1)

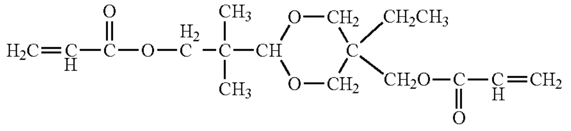

4.0 parts of electroconductive particles 1 as electroconductive particles

They were mixed in a mixed solvent of 5.0 parts of 1-propanol and 5.0 parts of cyclohexane and stirred with a stirrer for 6 hours. A coating solution for the protective layer was prepared in such a manner.

The charge transport layer was coated thereon with this coating solution for the protective layer by dipping the charge transport layer in the solution to form a coating film, and the coating film obtained was dried at 50° C. for 6 minutes. The coating film was then irradiated with electron beams for 1.6 seconds under a nitrogen atmosphere while rotating the support (irradiated object) at a speed of 300 rpm under the conditions: acceleration voltage of 70 kV and beam current of 5.0 mA. The dose at the protective layer position was 15 kGy.

Thereafter, the coating film was then raised to a temperature of 117° C. under a nitrogen atmosphere. The oxygen concentration from the electron beam irradiation to the subsequent heat treatment was 10 ppm.

Next, the coating film was cooled naturally in air until it reached a temperature of 25° C., and then heat-treated for 1 hour under the condition that the coating film reached a temperature of 120° C. to form a surface protective layer with a film thickness of 2 μm.

Electrophotographic photosensitive member 1 was produced in this manner. The physical properties of electrophotographic photosensitive member 1 are shown in Table 3.

TABLE 3

| | Electroconductive particle in surface protective layer | | Volume resistivity of surface |
|---|---|---|---|
| | Type | Content (% by volume) | protective layer (Ω · cm) |
| Electrophotographic photosensitive member 1 | Electroconductive particle 1 | 50.0 | $2.2 \times 10^{12}$ |
| Electrophotographic photosensitive member 2 | Electroconductive particle 2 | 60.0 | $1.0 \times 10^{10}$ |
| Electrophotographic photosensitive member 3 | Electroconductive particle 1 | 40.0 | $4.8 \times 10^{12}$ |
| Electrophotographic photosensitive member 4 | Electroconductive particle 1 | 30.0 | $1.1 \times 10^{13}$ |
| Electrophotographic photosensitive member 5 | Electroconductive particle 3 | 30.0 | $3.5 \times 10^{13}$ |
| Electrophotographic photosensitive member 6 | Electroconductive particle 4 | 30.0 | $1.9 \times 10^{10}$ |
| Electrophotographic photosensitive member 7 | Electroconductive particle 5 | 30.0 | 9.1 × 1012 |

TABLE 3-continued

| | Electroconductive particle in surface protective layer | | Volume resistivity of surface |
|---|---|---|---|
| | Type | Content (% by volume) | protective layer (Ω · cm) |
| Electrophotographic photosensitive member 8 | Electroconductive particle 6 | 30.0 | $1.6 \times 10^{10}$ |
| Electrophotographic photosensitive member 9 | Electroconductive particle 7 | 30.0 | $6.3 \times 10^{9}$ |
| Electrophotographic photosensitive member 10 | Electroconductive particle 8 | 20.0 | $1.7 \times 10^{12}$ |
| Electrophotographic photosensitive member 11 | Electroconductive particle 9 | 40.0 | $1.0 \times 10^{14}$ |
| Electrophotographic photosensitive member 12 | Electroconductive particle 10 | 70.0 | $5.2 \times 10^{10}$ |
| Electrophotographic photosensitive member 13 | Electroconductive particle 11 | 70.0 | $1.0 \times 10^{9}$ |
| Electrophotographic photosensitive member 14 | Electroconductive particle 5 | 19.0 | $4.6 \times 10^{13}$ |
| Electrophotographic photosensitive member 15 | Electroconductive particle 12 | 45.0 | $2.0 \times 10^{14}$ |
| Electrophotographic photosensitive member 16 | Electroconductive particle 13 | 75.0 | $5.0 \times 10^{8}$ |
| Electrophotographic photosensitive member 17 | — | Without electroconductive particle | $6.4 \times 10^{14}$ |

Production Examples of Electrophotographic Photosensitive Members 2 to 6, 8 to 13, 15 and 16

Each of electrophotographic photosensitive members 2 to 6, 8 to 13, 15 and 16 was produced in the same manner as in Production Example of electrophotographic photosensitive member 1 except that the type and content (% by volume) of the electroconductive particles used in (Production Example of surface protective layer) were changed as shown in Table 3. The physical properties of electrophotographic photosensitive members 2 to 6, 8 to 13, 15 and 16 are shown in Table 3.

Production Example of Electrophotographic Photosensitive Member 7

An electrophotographic photosensitive member 7 was obtained in the same manner as in Production Example of electrophotographic photosensitive member 1 except that (Production Example of surface protective layer) was changed as follows.

A coating solution for the surface protective layer was prepared as follows.

First, the following materials were prepared.

16.0 parts of electroconductive particles 5

10.0 parts of the compound represented by the following formula (H-7)

1.0 part of a polymerization initiator (1-hydroxycyclohexyl)(phenyl)methanone.

They were mixed with 40 parts of n-propyl alcohol and the mixture was dispersed in a sand mill for 2 hours to prepare a coating solution for the protective layer.

An electrophotographic photosensitive member 7 was produced in the same manner as for electrophotographic photosensitive member 1, except that this coating solution for the protective layer was used. The physical properties of electrophotographic photosensitive member 7 are shown in Table 3.

(H-7)

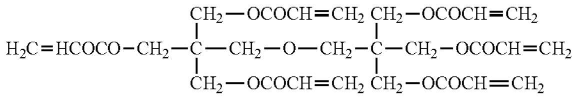

Production Example of Electrophotographic Photosensitive Member 14

An electrophotographic photosensitive member 14 was obtained in the same manner as in Production Example of electrophotographic photosensitive member 7 except that the amount of electroconductive particles 5 added in (Production Example of surface protective layer) was changed to 10.0 parts by mass. The physical properties of electrophotographic photosensitive member 14 are shown in Table 3.

Production Example of Electrophotographic Photosensitive Member 17

An electrophotographic photosensitive member 17 was obtained in the same manner as in Production Example of electrophotographic photosensitive member 1 except that (Production Example of surface protective layer) was changed as follows.

A coating solution for the surface protective layer was prepared as follows.

First, the following materials were prepared.

10.0 parts of a radical polymerizable monomer (product name: TMPTA, manufactured by Tokyo Chemical Industry Co., Ltd.)

5 parts of the compound represented by the following formula (H-1)

0.15 parts of the compound represented by the following formula (H-2)

0.15 parts of the compound represented by the following formula (H-3)

1.5 parts of fluororesin particles (product name: MPE-056, manufactured by DuPont-Mitsui Fluorochemicals Co., Ltd.)

0.75 parts of a photoinitiator (product name: Irgacure 184, manufactured by BASF Japan Ltd.)

(H-1)

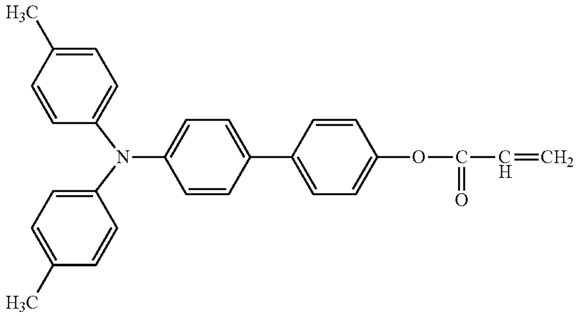

(H-2)

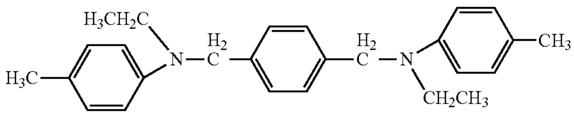

(H-3)

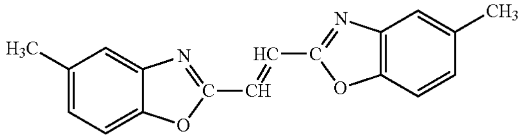

They were mixed into 100.0 parts of tetrahydrofuran and stirred with a stirrer for 6 hours to prepare a coating solution for the protective layer.

The charge transport layer was coated thereon with this coating solution for the protective layer by a spray coating method in a nitrogen gas stream to form a coating film, which was then left in a nitrogen gas stream for 10 minutes and dried. Thereafter, UV irradiation was carried out under the following conditions in a UV light irradiation booth in which the inside of the booth was replaced with nitrogen gas so that an oxygen concentration was 2% or less.

Metal halide lamp: 160 W/cm
Irradiation distance: 120 mm
Irradiation intensity: 700 mW/cm$^2$
Irradiation time: 60 seconds Furthermore, the coating film was dried at 130° C. for 20 minutes to form a surface protective layer with a film thickness of 5 μm.

An electrophotographic photosensitive member 17 was obtained in this manner. The physical properties of electrophotographic photosensitive member 17 are shown in Table 3.

Production examples of the toner will be described below.

Preparation Example of Binder Resin Particle Dispersion 78.0 parts of styrene, 20.7 parts of butyl acrylate, 1.3 parts of acrylic acid as a carboxy group-imparting monomer, and 3.2 parts of n-lauryl mercaptan were mixed and dissolved. To this solution was added an aqueous solution of 1.5 parts of NEOGEN RK (manufactured by Dai-ichi Kogyo Seiyaku Co., Ltd.) in 150.0 parts of ion-exchanged water, and the mixture is dispersed.

While stirring slowly for another 10 minutes, an aqueous solution of 0.3 parts of potassium persulfate in 10.0 parts of ion-exchange water was added. After nitrogen substitution, emulsion polymerization was carried out at 70° C. for 6 hours. After completion of the polymerization, the reaction solution was cooled to room temperature, and ion-exchanged water was added to obtain resin particle dispersion 1 with a solid concentration of 12.5% by mass and a volume-based median diameter of 0.2 μm.

The obtained resin particles were partially washed with pure water to remove a surfactant and dried under reduced pressure in order to measure an acid number. The acid number of the resin was measured and confirmed to be 9.5 mg KOH/g.

Preparation Example of Releasing Agent Dispersion 1

100.0 parts of behenyl behenate (melting point: 72.1° C.), 15.0 parts of NEOGEN RK were mixed with 385.0 parts of ion-exchanged water, and the mixture was dispersed for approximately 1 hour by using a wet-type jet mill JN100 (manufactured by Tsunemitsu Co., Ltd.) to obtain releasing agent dispersion 1. The wax concentration of releasing agent dispersion 1 was 20.0% by mass.

Preparation Example of Releasing Agent Dispersion 2

100.0 parts of pentaerythritol tetrabehenate (melting point: 84.2° C.) and 15 parts of NEOGEN RK were mixed in 385.0 parts of ion-exchanged water, and the mixture was dispersed for approximately 1 hour by using a wet-type jet mill JN100 (manufactured by Tsunemitsu Co., Ltd.) to obtain releasing agent dispersion 2. The wax concentration of releasing agent dispersion 2 was 20.0% by mass.

Preparation Example of Releasing Agent Dispersion 3

100.0 parts of hydrocarbon-based wax HNP-9 (manufactured by Nippon Seiro Co., Ltd., melting point: 75.5° C.) and 15.0 parts of NEOGEN RK were mixed in 385.0 parts of ion-exchanged water, and the mixture was dispersed for approximately 1 hour by using a wet-type jet mill JN100 (manufactured by Tsunemitsu Co., Ltd.) to obtain releasing agent dispersion 3. The wax concentration of releasing agent dispersion 3 was 20.0% by mass.

Preparation Example of Coloring Agent Dispersion 100.0 parts of carbon black "Nipex 35 (manufactured by Orion Engineered Carbons S. A.)" as a coloring agent and 15 parts of NEOGEN RK were mixed in 885.0 parts of ion-exchanged water, and the mixture was dispersed for approximately 1 hour by using the wet-type jet mill JN100 to obtain coloring agent dispersion.

Production Example of Silica Particle 1

A reactor with a stirrer was charged with untreated dry silica with a number-average particle size of 18 nm of a primary particle, and heated to 200° C. in a fluidized state by stirring.

The inside of the reactor was replaced with a nitrogen gas to seal the reactor, and 25.0% by mass of dimethyl silicone oil (viscosity=100 mm$^2$/second) was sprayed for 100.0% by mass of dry silica, and stirring was continued for 30 minutes. Thereafter, the silica sprayed raised to a temperature of 300° C. while stirring, and after stirring for another 2 hours, it was removed and subjected to pulverization treatment to obtain silica particles 1. It is noted that a degree of hydrophobicity of silica particle 1 was 94.0%.

Production Example of Toner 1

265.0 parts of resin particle dispersion, 10.0 parts of releasing agent dispersion 1, and 10.0 parts of coloring agent dispersion were dispersed by using a homogenizer (ULTRA-TURRX T50 manufactured by IKA Japan K. K.). While stirring, the temperature in the container was adjusted to 30° C., and a 1 mol/L sodium hydroxide solution was added to adjust a pH to 8.0.

An aqueous solution of 0.25 parts of aluminum chloride dissolved in 10.0 parts of ion-exchanged water was added as an aggregation agent at 30° C. under stirring over 10 min. After leaving the solution for 3 min, the mixture was raised up to a temperature of 50° C. to produce aggregated particles. In this state, a particle size of the aggregated particle is measured by a "Coulter Counter Multisizer 3®," manufactured by Beckman Coulter, Inc. When the weight-average particle size reached 6.0 μm, 0.90 parts of sodium chloride and 5.0 parts of NEOGEN RK were added to terminate particle growth.

A 1 mol/L sodium hydroxide aqueous solution was added to adjust a pH to 9.0, and then the mixture was raised to a temperature of 95° C. to spheroidize the aggregated particles. When average circularity reached 0.980, they were started to be cooled and cooled to room temperature to obtain toner particle dispersion 1.

To toner particle dispersion 1 obtained was added hydrochloric acid to adjust a pH to 1.5 or lower, and the mixture was stirred for 1 hour, left, and then underwent solid-liquid separation by using a pressure filter to obtain a toner cake. It was reslurried with ion-exchanged water to prepare dispersion again as a reslurry, which then underwent solid-liquid separation by using the filter described above. The reslurrying and solid-liquid separation were repeated until electrical conductivity of the filtrate reached 5.0 μS/cm or less, and the reslurry finally underwent solid-liquid separation to obtain a toner cake. The toner cake obtained was dried and further classified by using a classifier so that a weight-average particle size (D4) was 6.0 μm to obtain toner particle 1.

Silica particles 1 (1.0 parts) were externally mixed with toner particles 1 (100.0 parts) obtained above by FM10C (manufactured by Nippon Coke & Engineering Co., Ltd.). The external addition was carried out under the conditions where an A0 blade was used as a lower blade, a distance from a deflector wall thereto was set to 20 mm with the feed amount of the toner particle of 2.0 kg, rotation speed of 66.6 $s^{-1}$, external addition time of 10 minutes, cooling water at 20° C., and flow rate of 10 L/min.

The particles obtained above were then sieved through a mesh with an aperture of 200 μm to obtain toner 1. Table 4 shows the physical properties of the obtained toner 1.

TABLE 4

| | Release agent | Aggregation agent | | Multivalent metal element | |
|---|---|---|---|---|---|
| | Type | Type | Parts added (part by mass) | Type | Content (μmol/l) |
| Toner 1 | Behenyl behenate | Aluminum chloride | 0.25 | Aluminum | 0.24 |
| Toner 2 | Pentaerythritol behenate | Aluminum chloride | 0.25 | Aluminum | 0.24 |
| Toner 3 | HNP9 | Aluminum chloride | 0.25 | Aluminum | 0.24 |
| Toner 4 | Behenyl behenate | Aluminum chloride | 0.30 | Aluminum | 0.32 |
| Toner 5 | Behenyl behenate | Aluminum chloride | 0.45 | Aluminum | 0.50 |
| Toner 6 | Behenyl behenate | Aluminum chloride | 0.58 | Aluminum | 0.60 |
| Toner 7 | Behenyl behenate | Magnesium chloride | 0.22 | Magnesium | 0.45 |
| Toner 8 | Behenyl behenate | Magnesium chloride | 0.36 | Magnesium | 0.70 |
| Toner 9 | Behenyl behenate | Magnesium chloride | 0.42 | Magnesium | 0.80 |
| Toner 10 | Behenyl behenate | Calcium chloride | 0.48 | Calcium | 0.70 |
| Toner 11 | Behenyl behenate | Calcium chloride | 0.60 | Calcium | 1.10 |
| Toner 12 | Behenyl behenate | Iron(III) chloride | 0.35 | Iron | 0.75 |
| Toner 13 | Behenyl behenate | Iron(III) chloride | 0.50 | Iron | 1.25 |
| Toner 14 | Behenyl behenate | Aluminum chloride | 0.15 | Aluminum | 0.10 |
| Toner 15 | Behenyl behenate | Aluminum chloride | 0.08 | Aluminum | 0.08 |
| Toner 16 | Behenyl behenate | Iron(III) chloride | 0.66 | Iron | 1.50 |

Production Example of Toner 2

Toner 2 was obtained in the same manner as in Production Example of toner 1 except that releasing agent dispersion 2 was used. Table 4 shows the physical properties of the obtained toner 2.

Production Example of Toner 3

Toner 3 was obtained in the same manner as in Production Example of toner 1, except that releasing agent dispersion 3 was used. Table 4 shows the physical properties of the obtained toner 3.

Production Examples of Toners 4 to 6 and 15

Each of toners 4 to 6 and 15 was obtained in the same manner as in Production Example of toner 1, except that parts of aluminum chloride added as an aggregation agent were changed as described in Table 4. Table 4 shows the physical properties of the obtained toners 4 to 6 and 15.

Production Example of Toners 7 to 9

Each of toners 7 to 9 was obtained in the same manner as in Production Example of toner 1, except that the aluminum chloride added as an aggregation agent was changed to magnesium chloride, and the parts added were changed as shown in Table 4. Table 4 shows the physical properties of the obtained toners 7 to 9.

Production Example of Toners 10 and 11

Each of toners 10 and 11 was obtained in the same manner as in Production Example of toner 1, except that the aluminum chloride added as an aggregation agent was changed to calcium chloride, and the parts added were changed as shown in Table 4. Table 4 shows the physical properties of the obtained toners 10 and 11.

Production Example of Toners 12 to 14 and 16

Each of toners 12 to 14 and 16 was obtained in the same manner as in Production Example of toner 1, except that the aluminum chloride added as an aggregation agent was changed to iron (III) chloride, and the parts added were changed as shown in Table 4. Table 4 shows the physical properties of the obtained toners 12 to 14 and 16.

Example 1

A commercially available color laser printer, HP LaserJet Enterprise Color m553dn in which a portion thereof was modified, was used. For modification, a process speed of the main body was modified to 300 mm/sec, and necessary adjustments were made to enable image formation under this condition.

Moreover, the toner was also removed from the black toner cartridge which was then refilled with 320 g of toner 1. Furthermore, the photosensitive member was changed to photosensitive member 1 of the present disclosure. The toner cartridge thus obtained was installed in the black station, and a dummy cartridge was installed in other station, and the following image output tests were conducted. The evaluation results of the following evaluations 1 to 3 are shown in Table 5.

(Evaluation 1: Gradation Evaluation Under High Temperature and High Humidity Environments)

The printer described above was loaded with office70 (manufactured by Canon Inc.) as media, and 10,000 sheets of character pattern images with a coverage rate of 1% were fed through at 30.0° C./80% RH. At this time, the paper was fed through in a mode such that the printer was set to stop once before the next job started between jobs, as 2 sheets/1 job.

Figure 3:
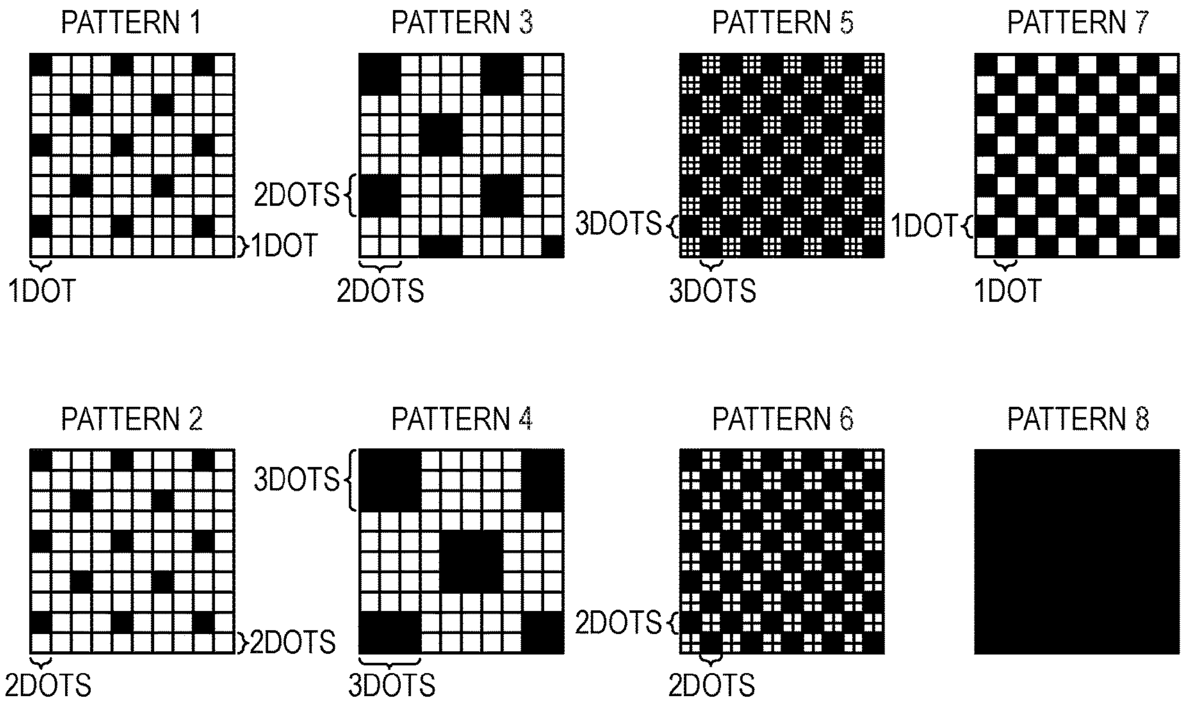
FIG. 3 is an example of an image used to evaluate gradation of the process cartridge according to the present disclosure.

After having fed the paper through, images from Pattern 1 to Pattern 8 having gradation with the image density illustrated in FIG. 3 were output, and each image density was measured by a)(Rite color reflectance densitometer (Color reflection densitometer X-Rite 404A) to determine each gradation.

In this evaluation, images were output in black monochrome. From the viewpoint of reproducibility of gradation, the density range of each pattern image is preferably within the following range, and evaluated from this viewpoint.

Pattern 1: 0.10 or more and less than 0.15
Pattern 2: 0.15 or more and less than 0.20
Pattern 3: 0.20 or more and less than 0.30
Pattern 4: 0.25 or more and less than 0.40
Pattern 5: 0.55 or more and less than 0.70
Pattern 6: 0.65 or more and less than 0.80
Pattern 7: 0.75 or more and less than 0.90
Pattern 8: 1.40 or more (Evaluation Criteria)

A: All pattern images satisfy the above density range.
B: One pattern image is out of the above density range.
C: Two pattern images are out of the above density range.
D: Three or more pattern images are out of the above density range.
E: Four or more pattern images are out of the above density range.

The level at which the effect is recognized to have been acceptable in this case is up to D.

(Evaluation 2: Fogging Evaluation in High Temperature and High Humidity Environments)

The aforementioned printer was loaded with XEROX4200 paper (manufactured by Xerox Corporation, 75 g/$m^2$) as media, and all-white images were each output using paper with a sticky note attached to a portion of a printing surface of the image for masking (white image 1) at 30.0° C./80% RH. Then, 10,000 sheets of character pattern images with a coverage rate of 1% were fed through. At this time, the paper was fed through in a mode such that the printer was set to stop once before the next job started between jobs, as 2 sheets/1 job. After having fed 10,000 sheets through, the printer was left for three days, and then all-white images were each output again using paper with a sticky note attached to a portion of a printing surface of the image for masking (white image 2).

After having removed the sticky note from white image 1, reflectance (%) of the portion where the sticky note was attached and that of the portion where it was not attached were measured at five points to obtain average values, respectively, and a difference thereof was then determined, which was adopted as initial fogging.

Furthermore, a difference of averages for white image 2 was determined in the same manner, which was used as fogging after endurance. A difference between the initial fogging and the fogging after endurance was calculated, and fogging after endurance was evaluated using the following evaluation criteria.

In addition, reflectance was measured by using a digital white light meter (Model TC-6D manufactured by Tokyo Denshoku, Co., Ltd., with green filter).

(Evaluation Criteria)

A: Difference in fogging between the initial and after endurance of less than 0.5%
B: Difference in fogging between the initial and after endurance of 0.5% or more and less than 1.5%
C: Difference in fogging between the initial and after endurance of 1.5% or more and less than 2.5%
D: Difference in fogging between the initial and after endurance of 2.5% or more The level at which the effect is recognized to have been acceptable in this case is up to C.

(Evaluation 3: Fogging Evaluation Under Low Temperature and Low Humidity Environments)

Fogging was evaluated after continuous use in low temperature and low humidity environments (15° C./10% RH). XEROX 4200 paper (manufactured by Xerox Corporation, 75 g/$m^2$) was used as evaluation paper.

In low temperature and low humidity environments, all-white images were each output by using paper with a sticky note attached to a portion of a printing surface of the image for masking (white image 3). Then, 10,000 sheets of character pattern images with a coverage rate of 1% were fed through. At this time, the paper was fed through in a mode such that the printer was set to stop once before the next job started between jobs, as 2 sheets/1 job. Thereafter, all-white images were each output again by using paper with a sticky note attached to a portion of a printing surface of the image for masking (white image 4).

After having removed the sticky note from white image 3, reflectance (%) was measured at five points for the portions where the sticky note was attached and the portion where it was not attached, respectively, each average value of reflectance was calculated, and a difference thereof was then determined, which was adopted as initial fogging.

Furthermore, a difference of the averages for white image 4 was determined in the same manner, which was used as fogging after endurance. A difference between the initial fogging and the fogging after endurance was calculated and fogging after endurance was evaluated using the following evaluation criteria.

In addition, reflectance was measured by using a digital white light meter (Model TC-6D manufactured by Tokyo Denshoku, Co., Ltd., with a green filter).

(Evaluation Criteria)

A: Difference in fogging between the initial and after endurance of less than 0.5%

B: Difference in fogging between the initial and after endurance of 0.5% or more and less than 1.5%

C: Difference in fogging between the initial and after endurance of 1.5% or more and less than 2.5%

D: Difference in fogging between the initial and after endurance of 2.5% or more The level at which the effect is recognized to have been acceptable in this case is up to C.

Examples 2 to 26, Comparative Examples 1 to 6

Each image output test was conducted in the same manner as in Example 1 except that the combination of the electrophotographic photosensitive member and the toner was changed as shown in Table 5, and the tests underwent evaluations 1 to 3. The evaluation results of each evaluation are shown in Table 5.

TABLE 5

| | Electrophotographic photosensitive member | Toner | Gradation | | | | |
|---|---|---|---|---|---|---|---|
| | Type | Type | Rank | Pattern 1 | Pattern 2 | Pattern 3 | Pattern 4 |
| Example 1 | Electrophotographic photosensitive member 1 | Toner 1 | A | 0.12 | 0.17 | 0.23 | 0.33 |
| Example 2 | Electrophotographic photosensitive member 1 | Toner 2 | A | 0.13 | 0.18 | 0.25 | 0.32 |
| Example 3 | Electrophotographic photosensitive member 1 | Toner 3 | B | 0.14 | 0.16 | 0.30 | 0.36 |
| Example 4 | Electrophotographic photosensitive member 1 | Toner 4 | A | 0.13 | 0.17 | 0.26 | 0.32 |
| Example 5 | Electrophotographic photosensitive member 1 | Toner 5 | B | 0.11 | 0.16 | 0.31 | 0.38 |
| Example 6 | Electrophotographic photosensitive member 1 | Toner 6 | B | 0.12 | 0.17 | 0.32 | 0.37 |
| Example 7 | Electrophotographic photosensitive member 1 | Toner 7 | A | 0.13 | 0.16 | 0.28 | 0.38 |
| Example 8 | Electrophotographic photosensitive member 1 | Toner 8 | B | 0.12 | 0.17 | 0.35 | 0.39 |
| Example 9 | Electrophotographic photosensitive member 1 | Toner 9 | B | 0.13 | 0.16 | 0.33 | 0.37 |
| Example 10 | Electrophotographic photosensitive member 1 | Toner 10 | B | 0.11 | 0.15 | 0.33 | 0.38 |
| Example 11 | Electrophotographic photosensitive member 1 | Toner 11 | B | 0.12 | 0.15 | 0.19 | 0.38 |
| Example 12 | Electrophotographic photosensitive member 1 | Toner 12 | A | 0.12 | 0.18 | 0.27 | 0.36 |
| Example 13 | Electrophotographic photosensitive member 1 | Toner 13 | C | 0.12 | 0.17 | 0.33 | 0.37 |
| Example 14 | Electrophotographic photosensitive member 1 | Toner 14 | C | 0.11 | 0.13 | 0.17 | 0.38 |
| Example 15 | Electrophotographic photosensitive member 2 | Toner 5 | B | 0.14 | 0.15 | 0.31 | 0.36 |
| Example 16 | Electrophotographic photosensitive member 3 | Toner 5 | B | 0.13 | 0.16 | 0.34 | 0.39 |

TABLE 5-continued

| | | | | | | | |
|---|---|---|---|---|---|---|---|
| Example 17 | Electrophotographic photosensitive member 4 | Toner 5 | C | 0.12 | 0.14 | 0.32 | 0.35 |
| Example 18 | Electrophotographic photosensitive member 5 | Toner 5 | C | 0.11 | 0.13 | 0.35 | 0.36 |
| Example 19 | Electrophotographic photosensitive member 6 | Toner 5 | C | 0.13 | 0.13 | 0.18 | 0.28 |
| Example 20 | Electrophotographic photosensitive member 7 | Toner 5 | C | 0.12 | 0.12 | 0.17 | 0.29 |
| Example 21 | Electrophotographic photosensitive member 8 | Toner 5 | C | 0.13 | 0.14 | 0.18 | 0.30 |
| Example 22 | Electrophotographic photosensitive member 9 | Toner 5 | C | 0.12 | 0.12 | 0.17 | 0.32 |
| Example 23 | Electrophotographic photosensitive member 10 | Toner 5 | C | 0.13 | 0.13 | 0.18 | 0.38 |
| Example 24 | Electrophotographic photosensitive member 11 | Toner 6 | C | 0.12 | 0.13 | 0.15 | 0.36 |
| Example 25 | Electrophotographic photosensitive member 12 | Toner 6 | C | 0.10 | 0.12 | 0.15 | 0.38 |
| Example 26 | Electrophotographic photosensitive member 13 | Toner 6 | C | 0.10 | 0.12 | 0.13 | 0.35 |
| Comparative Example 1 | Electrophotographic photosensitive member 14 | Toner 7 | D | 0.10 | 0.12 | 0.13 | 0.44 |
| Comparative Example 2 | Electrophotographic photosensitive member 15 | Toner 14 | D | 0.11 | 0.12 | 0.15 | 0.42 |
| Comparative Example 3 | Electrophotographic photosensitive member 16 | Toner 14 | D | 0.10 | 0.13 | 0.14 | 0.45 |
| Comparative Example 4 | Electrophotographic photosensitive member 17 | Toner 14 | D | 0.08 | 0.12 | 0.12 | 0.36 |
| Comparative Example 5 | Electrophotographic photosensitive member 11 | Toner 15 | D | 0.12 | 0.14 | 0.18 | 0.43 |
| Comparative Example 6 | Electrophotographic photosensitive member 11 | Toner 16 | D | 0.10 | 0.12 | 0.15 | 0.41 |

| | Gradation | | | | Fogging in high temperature and high humidity environments | | Fogging in low temperature and low humidity environments | |
|---|---|---|---|---|---|---|---|---|
| | Pattern 5 | Pattern 6 | Pattern 7 | Pattern 8 | Rank | Numerical value (%) | Rank | Numerical value (%) |
| Example 1 | 0.65 | 0.74 | 0.84 | 1.45 | A | 0.3 | A | 0.2 |
| Example 2 | 0.62 | 0.71 | 0.85 | 1.46 | A | 0.4 | A | 0.3 |
| Example 3 | 0.58 | 0.72 | 0.86 | 1.45 | A | 0.3 | A | 0.2 |
| Example 4 | 0.62 | 0.73 | 0.83 | 1.48 | A | 0.2 | A | 0.3 |
| Example 5 | 0.60 | 0.76 | 0.83 | 1.46 | A | 0.3 | A | 0.4 |
| Example 6 | 0.64 | 0.78 | 0.88 | 1.43 | B | 0.5 | A | 0.4 |
| Example 7 | 0.61 | 0.75 | 0.82 | 1.46 | A | 0.4 | B | 0.5 |
| Example 8 | 0.63 | 0.74 | 0.86 | 1.47 | B | 1.2 | A | 0.3 |
| Example 9 | 0.63 | 0.75 | 0.87 | 1.43 | C | 1.5 | A | 0.2 |
| Example 10 | 0.66 | 0.77 | 0.82 | 1.42 | B | 1.1 | A | 0.3 |
| Example 11 | 0.67 | 0.73 | 0.81 | 1.43 | C | 1.8 | A | 0.3 |
| Example 12 | 0.67 | 0.72 | 0.85 | 1.45 | A | 0.3 | B | 0.6 |
| Example 13 | 0.62 | 0.75 | 0.83 | 1.44 | C | 2.3 | A | 0.4 |
| Example 14 | 0.63 | 0.76 | 0.86 | 1.45 | B | 1.4 | C | 1.5 |
| Example 15 | 0.61 | 0.73 | 0.82 | 1.41 | A | 0.4 | A | 0.3 |
| Example 16 | 0.65 | 0.78 | 0.86 | 1.43 | A | 0.4 | A | 0.3 |
| Example 17 | 0.60 | 0.72 | 0.81 | 1.42 | B | 0.5 | A | 0.4 |
| Example 18 | 0.62 | 0.69 | 0.78 | 1.42 | B | 0.6 | A | 0.4 |
| Example 19 | 0.59 | 0.70 | 0.79 | 1.41 | B | 1.1 | B | 0.6 |
| Example 20 | 0.6 | 0.77 | 0.78 | 1.42 | B | 1.3 | B | 0.7 |
| Example 21 | 0.59 | 0.72 | 0.80 | 1.43 | B | 1.4 | B | 0.8 |
| Example 22 | 0.6 | 0.73 | 0.84 | 1.40 | C | 1.5 | B | 1.0 |

TABLE 5-continued

| | | | | | | | | |
|---|---|---|---|---|---|---|---|---|
| Example 23 | 0.64 | 0.78 | 0.83 | 1.43 | B | 1.4 | B | 1.4 |
| Example 24 | 0.66 | 0.72 | 0.77 | 1.42 | C | 1.6 | B | 1.3 |
| Example 25 | 0.59 | 0.78 | 0.82 | 1.43 | B | 1.4 | C | 1.7 |
| Example 26 | 0.65 | 0.78 | 0.83 | 1.45 | C | 1.9 | C | 2.0 |
| Comparative Example 1 | 0.62 | 0.76 | 0.83 | 1.42 | C | 2.6 | B | 0.8 |
| Comparative Example 2 | 0.68 | 0.72 | 0.82 | 1.41 | B | 1.4 | C | 1.6 |
| Comparative Example 3 | 0.67 | 0.70 | 0.75 | 1.42 | C | 2.2 | C | 1.5 |
| Comparative Example 4 | 0.66 | 0.73 | 0.83 | 1.43 | B | 1.3 | C | 2.2 |
| Comparative Example 5 | 0.68 | 0.72 | 0.83 | 1.40 | C | 2.1 | C | 2.3 |
| Comparative Example 6 | 0.68 | 0.77 | 0.90 | 1.42 | C | 2.4 | B | 1.4 |

According to the present disclosure, a process cartridge that inhibits fogging and is capable of forming an image with excellent gradation regardless of the usage environment, can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-166513, filed Oct. 8, 2021, Japanese Patent Application No. 2022-129340, filed Aug. 15, 2022, and Japanese Patent Application No. 2022-146705, filed Sep. 15, 2022, which are hereby incorporated by reference herein in their entirety.

What is claimed is:

1. A process cartridge that is detachable from a main body of an electrophotographic apparatus, the process cartridge comprising:

an electrophotographic photosensitive member; and a development unit that comprises a toner storage portion accommodating toner and is configured to supply the toner to a surface of the electrophotographic photosensitive member;

the electrophotographic photosensitive member comprising an electroconductive support, with a photosensitive layer and a surface protective layer formed thereon in this order;

the toner comprising an external additive, and a toner particle comprising a binder resin and at least one multivalent metal element selected from the group consisting of aluminum, magnesium, calcium and iron; and the surface protective layer comprising an electroconductive particle, the electroconductive particle comprising a niobium atoms-containing titanium oxide particle, wherein the niobium atoms-containing titanium oxide particle comprises 2.6 to 10.0% by mass of niobium atoms, a content of the electroconductive particle is 20.0 to 70.0% by volume of a total volume of the surface protective layer, the surface protective layer has a volume resistivity of $1.0\times10^{9}$ to $1.0\times10^{14}$ Ω·cm, and a total content of the multivalent metal elements in the toner particle is 0.10 to 1.25 μmol/g as measured by coupled induction plasma atomic emission spectrometry (ICP-AES).

2. The process cartridge according to claim 1, wherein, with respect to the multivalent metal elements contained in the toner particle, a content of aluminum is 0.50 μmol/g or less;

a content of magnesium is 0.80 μmol/g or less;

a content of calcium is 0.90 μmol/g or less and a content of iron is 1.25 μmol/g or less.

3. The process cartridge according to claim 1, wherein the toner particle comprises 0.10 to 0.32 μmol/g of aluminum as the multivalent metal element.

4. The process cartridge according to claim 1, wherein the toner particle comprises a wax that is an ester compound.

5. The process cartridge according to claim 1, wherein a carboxy group is present in a molecular chain constituting the binder resin, and the carboxy group and the multivalent metal element form a coordination bond and are present in the toner particle.

6. The process cartridge according to claim 1, wherein the toner particle is an emulsion aggregation toner particle.

7. The process cartridge according to claim 1, wherein in the electrophotographic photosensitive member, a content of the electroconductive particle is 40.0 to 70.0% by volume of the surface protective layer, and the surface protective layer has a volume resistivity of $1.0\times10^{10}$ $1.0\times10^{14}$ Ω·cm.

* * * * *